United States Patent [19]

Potter

[11] Patent Number: 5,528,493
[45] Date of Patent: Jun. 18, 1996

[54] OBSERVATIONS FROM BELOW A ROUGH WATER SURFACE TO DETERMINE CONDITIONS OF OR ABOVE THE SURFACE WAVES

[75] Inventor: Randall E. Potter, North Hills, Calif.

[73] Assignee: Areté Associates, Sherman Oaks, Calif.

[21] Appl. No.: 294,241

[22] Filed: Aug. 22, 1994

[51] Int. Cl.$^6$ ................................................. G06F 19/00
[52] U.S. Cl. ............................................................. 364/420
[58] Field of Search ........................... 364/420; 395/928, 395/930, 931

[56] References Cited

U.S. PATENT DOCUMENTS

| | | | |
|---|---|---|---|
| 3,876,312 | 4/1975 | Harcrow, Jr. | 356/208 |
| 4,988,885 | 1/1991 | Lindstrom | 250/560 |
| 5,311,272 | 5/1994 | Daniels et al. | 356/5 |
| 5,350,922 | 9/1994 | Bartz | 260/388.5 |
| 5,418,608 | 5/1995 | Caimi et al. | 356/3.01 |

OTHER PUBLICATIONS

Smith, Ben, "Data from the Depths", Byte, vol. 18, Issue 8, Jul. 1993, pp. 69, 71, 74 76–78.
Raloff, Janet, "Lasers map slicks from the air . . . ," Science News, vol. 143, Issue 17, Apr. 24, 1993, p. 266.

*Primary Examiner*—Donald E. McElheny, Jr.
*Attorney, Agent, or Firm*—Ashen & Lippman

[57] ABSTRACT

Local data about the ocean surface and what is above it are used to improve public radio and TV weather reporting; to improve small-craft ocean traffic safety in view of local precipitation, wind, icebergs, or cloudiness; or to improve performance of wind-sensitive sound-receiving apparatus. (As to weather reporting, one mechanism is in effect a calibration of simultaneous satellite-based data. As to acoustic receivers, the mechanism is orienting receivers to the wind, to minimize wind-noise pickup.) These functions are based on observing, from a distance below the surface, light intensities of many areas of the irregular water surface. From these intensities surface-slope magnitudes and orientations are estimated; analysis of this information enables a quantitative, dynamic representation of the water surface itself. From this model in turn, the conditions enumerated earlier are inferred. The invention operates from a bottom-mounted or -tethered undersea platform or from mobile equipment, and in the latter case particularly can also advantageously provide a visual analogue of above-surface features for use in enhancing operations of that equipment.

34 Claims, 10 Drawing Sheets

Microfiche Appendix Included
(1 Microfiche, 74 Pages)

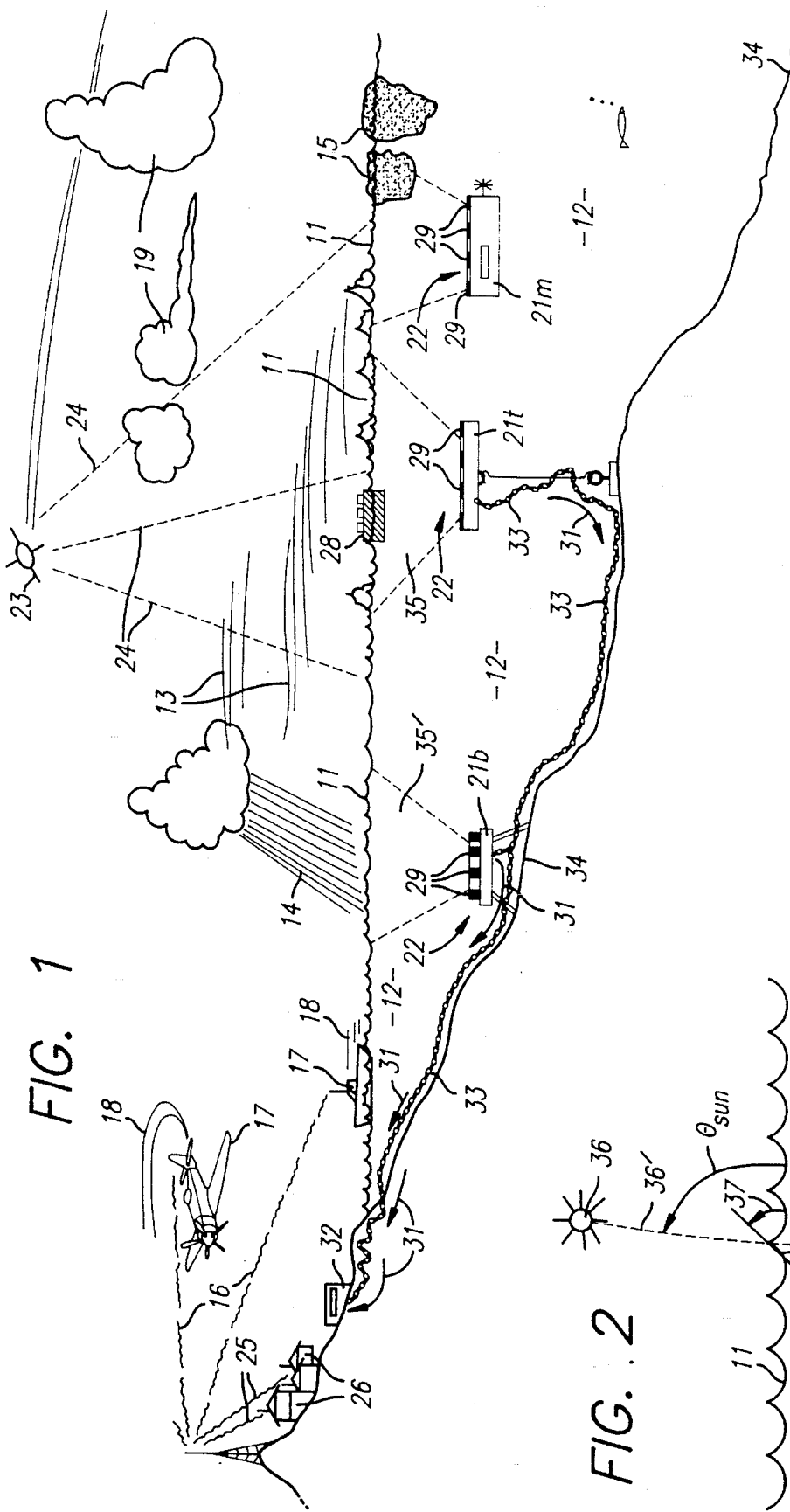

OBSERVATIONS FROM BELOW A ROUGH WATER SURFACE TO DETERMINE CONDITIONS OF OR ABOVE THE SURFACE WAVES

REFERENCE TO MICROFICHE APPENDIX

A microfiche appendix (not printed) contains one fiche, with a total of seventy-four frames. Contents of the appendix are summarized in part 9 of the "DETAILED DESCRIPTION" section of this document.

BACKGROUND

1. FIELD OF THE INVENTION

This invention relates generally to observations of the environment that can be made underwater; and more particularly to use of observations from below a rough water surface to determine and use details of the water surface waves—and, based on such details, various above-surface data.

2. PRIOR ART

Even though most of the earth's surface is covered by water—mainly ocean—and satellites now provide observation of conditions at and above the ocean surface, still these observations do not provide detailed close-up data for the characteristics of the ocean surface, and what is going on in and just above that surface. Such data could be extremely useful in improving interpretation of, for instance, satellite radar data to enhance weather prediction, and also in promoting safer use of the ocean regions by many different kinds of air- and water-craft, and improved operation of various automatic sensor arrays.

It is true that such data can be acquired by manned or unmanned equipment floating on the ocean surface, but stations or vessels carrying such equipment are subject to destructive weather events and interactions with shipping. Submerged apparatus whether bottom-resting, bottom-tethered, or mobile is insulated from these problems, and could acquire such data for either relay (e.g., by cable) to land-based stations for beneficial use, and/or for accumulation while at sea and later batch-wise downloading to land stations, and/or even to enhance operations of the submerged apparatus itself.

In addition to the possibility of positioning special submerged observation apparatus at many places around the world, underwater craft are already deployed around the world continuously in considerable numbers. They are thus potentially positioned to collect a large amount of useful local microdata about water surfaces—and the space above them—that later could be beneficially employed by correlation with other information (for instance, satellite radar pictures) to enhance the interpretation of that other information as well as operations of the craft. Observational limitations, however, deter effective use of this great potential resource.

Unfortunately submerged underwater apparatus is severely limited in ability to detect conditions at or above the surface, and even ability to receive data communications from above the surface. Light and other electromagnetic radiation are strongly attenuated in passing through water, particularly ocean water; acoustic transmission too is limited in range, and awkward for both observation and data transmission.

Thus for example direct optical observation of the surface from below is inadequate to determine whether the weather or water-surface conditions are satisfactory for operations at or above the surface by small craft etc. Some planned operations may be practical or desirable only if there is no heavy rain, or only when wave action is moderate, or only if wind direction and speed are within some range of desired values. As another example, before moving underwater equipment to the surface it would be desirable to have information suggesting that possible collision hazards might be somehow minimized.

The electromagnetic spectrum provides practical means of observation and communication only in two wavelength ranges: in the blue-green part of the visible spectrum (and even there over only very short distances, such as a few hundred meters) and at so-called "extra low frequencies" (ELF) in the radio spectrum.

Ordinarily such objects as surface craft are not readily localized through observation in the extra-low-frequency part of the spectrum. This is so not only because they normally radiate little in the ELF spectral region, and not only because the level of ambient radiation (which might be thought serviceable for observation by reflected ambient) is low, but primarily because the corresponding wavelengths are on the order of 100,000 kilometers.

Thus over terrestrial distances such radiation is inherently omnidirectional. Acoustics is commonly used for sounding and location of nearby objects, and is far more directional than ELF radio—but still imprecise, due to diffusion of acoustic vibration by the water.

Direct visual observation through the air above the water surface, from underwater positions of a submerged vehicle, is of course normally impossible because of the image-scrambling effect of the water surface. Some underwater equipment commonly is equipped with periscopes, which bypass the limitations of water as a transmission medium and employ observation purely through the air.

It might be supposed that such a device could be used to overcome the difficulties outlined in the foregoing paragraphs. Unfortunately these simple mechanical devices serve only when the equipment is within some meters of the surface.

In such shallow positions the submerged apparatus is already within collision range for large surface craft, and of course the periscope itself is within collision range for all surface craft. Furthermore the operations of underwater equipment are more stable and generally more useful at greater depths.

As to communications, a global system of ELF radio transmissions is maintained for sending messages underwater to either stations or craft. Unfortunately the frequency of 14 these vibrations is so low—and the number of receivers that share the system so great—that only extremely short messages can be provided in any normal transmission interval, and particularly to any one receiver.

High-bandwidth transmissions from above the surface are not receivable by equipment at normal operating depths of, for example, thirty meters or more. For instance signals from a blue-green laser beacon (projected, for example, from a satellite) could be transmitted toward the water—but would be badly and dynamically fragmented, and all the fragments dynamically redirected or scrambled, from a rough water surface.

Underwater equipment would not know in which direction to look, at each instant, to see such signals. Most of the energy in acoustic messages from above the water surface would be reflected by the surface.

Thus it can be seen that the prior art in the area of underwater operations has failed to provide effective capability for acquiring information about conditions and details—and for receiving communications from broadband signal transmitters—at and above the surface.

I wish to mention some earlier technological developments that have never heretofore been associated with the operation of underwater apparatus, or with the problems discussed above. One spans the areas of astronomy and what might be called pseudoastronomy—i. e., visual tracking of satellites.

A second is in the area of satellite-based data collection to analyze conditions of the ocean surface. A third earlier area relates to radar processing.

As to the first, it is known to enhance telescope observations through layers of dynamically shifting atmospheric disturbance, by making correspondingly dynamic compensating adjustments in the focus of the telescope. Focal calibration for this purpose is enabled by a reference source such as a bright star of known position—or an optical beacon, either satellite-based or projected from the ground.

The reference actual or artificial "guide star" must be found or placed angularly very near the object to be observed; and focal compensation (inclusion of the "conjugate" of the atmospherically introduced perturbation) is provided through use of adaptive optics—systems in which a telescope reflector is formed from multiple individually servocontrolled reflecting facets. An anecdotal survey of such work appears at Collins, "Making Stars to See Stars . . ." 45 *Physics Today* 17–21 (February 1992).

As to the second earlier field of work mentioned above, Cox and Munk have described use of marine-surface observations by airborne or orbiting optical instruments to determine the energy-spectral density of ocean waves. See "Measurements of the Roughness of the Sea Surface from Photographs of the Sun's Glitter", 44 *J. Optical Society of America* 838–50 (November 1954). Their work used the visual "sky gradient" (angular dependence of apparent brightness of the daytime sky) as a reference, and relied upon a theory of preferential reflectance of certain parts of the sky by nonuniform wave-surface angles to support Fourier-transform calculations leading to the desired energy analysis.

Cox and Munk neither proposed nor suggested any effort to dissect the wave-formed remapping of the sky to learn or use the orientations of, for example, individual waves. They simply performed a mathematical reversal of the over remapping to learn something about the as-ensemble properties of the water surface as a distorting/reimaging element.

The third previously mentioned earlier technology, dating to the 1960s, relates to processing of synthetic-aperture radar images. The noteworthy aspect of that work is simply that it provides an instance of a sort of image processing by analog (as distinguished from digital) computers.

No connection between any of these three earlier technologies and the observation/communication problems discussed in the preceding passages of this document has heretofore been drawn.

As can now be seen, in the field of the invention the prior art has failed to provide solutions to important difficulties of observing the operating environment and receiving communications.

SUMMARY OF THE DISCLOSURE

The present invention corrects the failings of the prior art. The invention has several aspects which can be practiced independently, although for optimum enjoyment of the benefits of the invention I prefer to use several of them in conjunction together.

In a first of its main aspects, my invention is a method for obtaining and using information about an irregular water surface. The method obtains such information based upon optical observations made from a distance below the surface.

For this purpose (and for the purpose of other aspects of my invention introduced later in this document), I intend the phrase "a distance" to encompass distances as short as perhaps five or ten meters, though I consider a distance of roughly thirty to sixty meters ideal. I also intend to encompass distances as long as perhaps one hundred to three hundred meters or more, depending on local clarity of the water.

The method includes the step of, from below the water surface, observing through the water directly the respective light intensity of each of a large number of areas of the irregular water surface. By the phrase "through the water directly" (here and in later-introduced aspects of the invention) I mean to distinguish observations made through air that is held within a chamber—as for example through an air-filled tube.

It will be understood, however, that a segment of the light-transmission path that is nearest the observing point may typically traverse a relatively short path through air, as needed to reach a port of glass or like material, and of course in such a case also traverses the port itself. My phrase "through the water directly" accordingly is to be understood as encompassing observations having short light-path segments through air, glass, etc. incidental to transmission through water for the rest of the above-mentioned "distance".

The areas mentioned above may be individual pixels of an image-collecting system—such as for example pixels defined by a fixed or scanning array of charge-coupled detectors (CCDs), or pixels defined as positions along successive line scans in a raster system such as typically used in video cameras. Alternatively, the "areas" may be groupings of such pixels: either fixed arbitrary groupings, or groupings based on instantaneously observed relationships between the observed light intensities, or groupings defined in other ways such as will be suggested by the remainder of this description of my invention.

The method of this first aspect of the invention also includes the step of, based on the observed light intensity for each of the areas, estimating surface-slope magnitudes and orientations for at least some of the areas. Various techniques for making such estimates will be described in detail shortly.

This method also includes the steps of assembling the light-intensity information, at least for selected areas, to form a quantitative representation of the irregular water surface; and applying the water-surface representation to control a physical process that is one of these:

(a) using the representation to improve live radio and television weather reporting to the public—by (1) characterizing interaction between the water surface and radar waves or other electromagnetic radiation, then (2) using the thus-characterized radiation interaction to refine characterization of electro-magnetic-radiation observations made by satellites above the surface, then (3) using the thus-refined satellite-observation characterization to enhance weather characterization and prediction by satellite-performed electromagnetic-radiation observations, and then (4) reporting the thus-enhanced weather characterization and prediction to the public through public news media such as live television and radio news programs;

(b) using the representation to improve the safety of small-craft ocean traffic, by (1) characterizing precipitation conditions above the surface, then (2) using the thus-characterized precipitation conditions to help make decisions about use of the surface and space above the surface by small craft, and then (3) controlling such small-craft use according to the thus-made decisions;

(c) using the representation to further improve the safety of small-craft ocean traffic—by (1) estimating direction and speed of wind above the surface, then (2) using the thus-estimated wind direction and speed to help make decisions about use of the surface and space above the surface by small craft, and then (3) controlling such use according to the thus-made decisions;

(d) using the representation to improve performance of wind-direction-sensitive sound-receiving apparatus such as an acoustic sensing array—by (1) estimating direction and speed of wind above the surface, (2) using the thus-estimated wind direction and speed to help make choices of acoustic-sensing-array orientation, and (3) orienting at least one acoustic sensing array according to the thus-made choices;

(e) using the representation to improve safety of boat traffic in areas subject to icebergs—by (1) obtaining information about presence of icebergs, (2) using the thus-obtained information to help make a plan for use of the surface by boats, and (3) controlling such use by least one boat according to the thus-made plan; and (f) further improving the safety of small-craft ocean traffic—by (1) associating said respective light intensity with respective above-water direction, for each of the areas, through use of the estimated surface-slope magnitudes and orientations; (2) assembling the light-intensity information as a function of direction, at least for selected areas, to determine whether it is cloudy above the surface, (3) using the cloudiness determination to help make decisions about use of the surface or space above the surface by small craft, and (4) controlling such small-craft use according to these decisions.

In the preceding enumeration of physical-application steps, the phrases "small craft" and "small-craft ocean traffic" refer to both general-aviation and boating traffic.

The foregoing may be a description or definition of the first aspect of my invention in its broadest or most-general form. As can now be readily appreciated by reference to the earlier "PRIOR ART" section of this document, even in this broad form the invention provides advantages and benefits to the collection and beneficial use of information about the ocean surface and air above it—advantages that heretofore have not been available in the prior art.

Even though the first aspect of the invention, as thus broadly regarded, offers important benefits and advantages, nonetheless to maximize enjoyment of these significant benefits I prefer to practice this aspect of the invention with certain additional features or characteristics. For example I prefer that the slope-estimating step include the substep of correlating at least one known illumination pattern above the surface with light intensity of some of the areas observed from below the surface.

Such a known illumination pattern preferably includes direct illumination from an astronomical object in a known position, and still more preferably such an object is the sun or the moon. The position of the sun and moon can be known very precisely to operators of underwater craft; and automatic equipment can be made to store and refer to such positional information for purposes of my invention.

Thus correlation of observed light intensities with any such known illumination pattern provides an initial toehold in estimating the slope orientations and magnitudes for water-surface areas—particularly those areas at which intensities that may be expected from the known illumination pattern do appear. As these will typically be only a small fraction of all the areas, however, I prefer to include other substeps in the slope-estimating step.

For example, I prefer that the slope-estimating step also include the substep of determining bounds for slopes of some areas, other than those areas where the known illumination pattern is seen, based upon a priori knowledge of physical phenomena. I also prefer that the slope-estimating step include coordinating the correlating and the bound-determining substeps to estimate slopes for still other areas.

In this regard I further prefer that the slope-estimating step include coordinating the correlating and the bound-determining substeps to predict future slopes; and coordinating the predicted future slopes with later correlating and bound-determining substeps to refine the slope-estimating step for still-later observations.

As to the previously mentioned "large number of areas of the irregular water surface", I prefer that this number be greater than 10,000—and still more preferably on the order of 250,000.

In a second of its main aspects, my invention is a novel method for collecting above-water data, when the water surface is irregular. In this aspect as in the first aspect, the method is based upon optical observations made from a distance below the surface.

The method includes the steps of, from below the water surface, preliminarily observing through the water directly the respective light intensity of each of a large number of areas of the irregular water surface; and, based on the observed light intensity for each of the areas, preliminarily estimating surface-slope magnitudes and orientations for at least some of the areas.

In addition the method of this second aspect of the invention includes the step of, based upon the observed light intensities and on the slope-magnitude and slope-orientation estimates, predicting a time and a limited water-surface region at which conditions will be particularly favorable for collecting above-water data. Examples of such conditions and corresponding such data will be presented shortly.

The method now under discussion also includes the step of, after the predicting step, applying the predictions to control selective observation, through the water directly, of the respective light intensity of each of a large number of areas of the irregular water surface in the predicted region at the predicted time. These selective observations are not necessarily exclusive of all other areas, but at the least emphasize collection of information from the predicted region at the predicted time in relation to other areas and/or times.

Thus for example an optical system may zoom in toward a predicted region shortly before the predicted time, and zoom 9 back out shortly after—in such a way that even at the predicted time information is collected from some areas near but outside the predicted region. Such adjacency information may be used, if desired, for example to help keep the information from the predicted region in register with information from other areas.

Alternatively information may be collected at, for example, a greater density within the predicted region and at a reduced density over the remainder of the usual field of view. These alternatives and other analogous variants are within the scope of the selectively-observing step mentioned above The foregoing may be a definition or description of the second aspect of my invention in its most general or broad form. Even as so broadly expressed, however, the benefits of this aspect of my invention relative to the prior art can now be appreciated: this aspect of the invention enables a great advance in efficiency, time, cost, etc. of data acquisition (as for example in practicing the other aspects of my invention), since in special circumstances data can be collected almost exclusively for phenomena of particular interest.

Thus this second aspect of my invention too, as broadly couched, offers important benefits and advantages. Nevertheless I prefer to practice this aspect of the invention with certain features or characteristics, once again to optimize the enjoyment of these benefits and advantages.

For instance I consider it preferable to use substantially the same substeps discussed earlier for estimating the slopes of the water surface in practice of the first aspect of my invention. I also prefer to use generally the same number of water-surface areas as mentioned earlier in connection with that first aspect.

In addition I prefer that the method in this second aspect of my invention include the added step of, based on the selectively observed light intensity for each of the areas at the predicted region and time, estimating corresponding surface-slope magnitudes and orientations for at least some of the areas at the predicted region and time.

I also prefer to include in this method other steps, for example the step of associating the selectively observed respective light intensity with respective above-water elevation and azimuth, for the at least some areas at the predicted region and time, through use of the estimated corresponding surface-slope magnitudes and orientations for the at least some areas at the predicted region and time. (This step will later be recognized as analogous to an associating step in the third aspect of my invention—but performed with respect to only the selectively observed intensities.)

In addition I prefer in some circumstances that the predicted time and region be identified with formation of a relatively tall wave. In this case the portion of the above-water scene for which data-collecting conditions will be particularly favorable is at a relatively low angle of elevation above the horizon—a useful region, since it corresponds to relatively very remote objects.

Under other circumstances I consider it preferable that the predicted time and region be identified with formation of a relatively very smooth surface area. In this case data for a portion of the above-water space may be acquired with minimal necessity for unscrambling, and only the necessity—if position of that portion is important to the application at hand—of correcting for deflection of the incoming information by refraction at the smooth surface.

In preferred embodiments of a third of its aspects, the invention is a method for obtaining and using, when the water surface is irregular, above-water-surface information—rather than information about the surface itself as in the first aspect of the invention discussed already. This method too, however, is based upon optical observations made from a distance below the surface.

Like the first two methods, this method includes the steps of, from below the water surface, observing through the water directly the respective light intensity of each of a large number of areas of the irregular water surface; and, based on the observed light intensity for each of the areas, estimating surface-slope magnitudes and orientations for at least some of the areas.

In addition this method includes the step of associating the respective light intensity with respective above-water elevation and azimuth, for the same "at least some" areas. This associating step is performed straightforwardly through use of the estimated surface-slope magnitudes and orientations, applying the well-known Snell's Law to account for the deflection of light paths by refraction.

That is to say, each of the "at least some" areas is observed along a well-defined light path through the water directly, and has an estimated slope magnitude and orientation. The angle between the light path and each surface-area normal, considered together with Snell's Law, establishes the deflection undergone by incoming light that passes through that area.

This deflection, considered together with the light path through the water, establishes an estimated path through the air approaching the same surface area. The elevation and azimuth of this path are taken as the above-water elevation and azimuth with which the corresponding light intensity, observed through the same surface area, should be associated in the "associating" step.

In this way many individual small pieces of the above-water space are associated with respective light-intensity information. The method of this third phase or aspect of the invention also includes the step of assembling the light-intensity information as a function of above-water elevation and azimuth, at least for selected areas, to form an above-water representation—typically a data array.

In a sense this "assembling" step is a reassembling step, since the above-water information may be regarded as having been disassembled or fragmented in passage through the many water-surface areas or facets, seemingly oriented at random. As will be seen, the orientations are not truly random, and in the practice of my invention important relationships between the orientations of nearby areas can be found and used to help form the slope estimates mentioned earlier.

All such semantics aside, my invention seeks to assign or associate near-original elevation and azimuth values to the light intensities received through each of many small water-surface areas. The invention then uses these associations to form the above-water representation.

Another step of the third aspect or method of my invention is applying the representation to control a physical process. The process is one of these:

(a) selectively collecting and interpreting optical information from a portion of what is above the surface that includes an optical information source, to receive information from the source, (b) based upon the representation, deciding whether to move from below the surface to the surface, and then moving or not moving from below the surface to the surface in accordance with said deciding, (c) based upon the representation, determining whether to move or not move while below the surface, so as to avoid or encounter an object that is at least partly underwater and is at a distance, and then moving or not moving in accordance with said determining, and (d) displaying a visible image that has light intensity as a function of elevation and azimuth substantially in accordance with said representation.

The foregoing may be a description or definition of the third aspect of the invention in its broadest or most general form. Even in this general or broad form, however, as can now be seen the third aspect of my invention resolves many of the problems suffered by users of the prior art.

More specifically, the invention in this third aspect enables a usable representation of the above-water space to be obtained from underwater. Such a representation may be most intuitively understood as having the form of a visible image—but other forms, concentrating on specific desired data relationships rather than visible features as such, will be preferred instead for some tasks or applications.

In event the physical process does comprise image display, I have several preferences:

the method best includes the further step of—before or during the displaying step—modifying the representation to compensate for elevation distortion arising in the associating step;

to expand the capabilities of the invention the method preferably includes, before the visible-image displaying step, the steps of recording the representation or visible image and then retrieving the recorded representation or image for use in the displaying step; and when such recording is employed, a suitable record is best made by photography, videotape, digital data tape, computer disc, or memory cache.

More generally, and as suggested earlier in this document, I prefer that the intensity-associating step comprise the substeps of determining an observation angle for each of the areas; and applying Snell's law to the determined observation angles and estimated slopes. Specifically in this connection I also prefer that the intensity-associating step further include the substeps of determining the observation depth and then allowing for intensity attenuation due to propagation distance through water for each of the at least some areas.

In a fourth of its main aspects, preferred embodiments of my invention provide apparatus for obtaining and using an above-water-surface representation, when the water surface is irregular, based upon optical observations made from a distance below the surface. It is here understood that the irregular surface has the effect of scrambling what is above the water as viewed from the "distance" below the surface.

The apparatus includes some means for disposition at a distance below the surface to receive light from the surface, through the water directly, and in response generate signals corresponding to intensity of the received light as a function of reception angle. These means operate by optical sensing, and for purposes of generality and breadth in description of the invention will be here called simply the "optical sensor means".

In addition the apparatus includes some means for processing the signals to analyze and correct for at least part of the scrambling effect of the surface and so form a representation of at least part of what is above the water. These means include at least one programmed processor, and—here too for breadth and generality—will be called the "programmed processor means" or simply the "processor means".

Further the apparatus of this fourth aspect of the invention includes some means for applying the representation to control a physical process. These means, again for generality and breadth, I shall call the "utilization means".

As will be appreciated, this fourth aspect of the invention as thus broadly couched offers many advantages and benefits including those of the third aspect of the invention—and others as well, since the utilization means here may apply the representation to control physical processes other than the enumerated third-aspect processes and their equivalents.

Here too I prefer to practice the invention in conjunction with further characteristics or features that enhance its benefits and advantages.

For example I prefer that the sensor means include some means for generating electronic signals, and the processor means comprise at least one electronic processor. My invention is amenable, however, to practice with one or more other types of processors—such as for instance an optical processor.

I prefer that the sensor means comprise means for generating digital signals, and the processor means comprise at least one digital processor. Once again, however, my invention may be practiced using one or more other types of processors—as, for example, analog processors.

Furthermore I prefer that the processor means include some means for forming a first signal matrix corresponding to intensity of received light as a function of reception angle; and some means for analyzing the first signal matrix to estimate surface-slope magnitudes and orientations for a large number of areas of the irregular water surface.

In this case I also prefer that the processor means include some means for interpreting the first signal matrix, through use of the estimated surface-slope magnitudes and orientations, to form a second signal matrix corresponding to intensity of received light as a function of elevation and azimuth of what is above the water, at least for selected areas.

While the utilization means in this fourth aspect of my invention may take any of a great variety of forms, I prefer that the utilization means include at least one of these:

means for utilizing the second signal matrix as a representation of at least part of what is above the water to control a physical interaction with elements of what is above the water; or means for using the representation to display a visible image intuitively usable by a human being as a visual analogue of at least a part of what is above the water; in which case the "physical process" is the display.

In the latter case I further prefer that the visible image have light intensity as a function of elevation and azimuth substantially in accordance with at least a part of the representation. In this regard I also deem it preferable that the utilization means include some means for modifying the representation, before or during the display, to correct for altitude distortion in the representation.

As to the fourth aspect of the invention generally, I prefer that the apparatus of my invention further include movable underwater equipment carrying the already-mentioned apparatus, in position to receive light from the water surface at least when the equipment is at a distance below the water surface. In this case the utilization means preferably comprise means for applying the representation of the above-water scene to control operations of the equipment.

For example, and preferably, the representation-applying means control one or more of these operations: steering the equipment in any of three dimensions, and receiving messages from at least one discrete source above the surface.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a schematic representation of preferred embodiments of the invention in use;

FIG. 2 is a diagram showing how preferred embodiments of the invention use a known position of the sun to estimate ocean slopes;

DETAILED DESCRIPTION OF THE PREFERRED EMBODIMENTS

The following information is addressed to personnel of ordinary skill in the art, which here means senior technicians and senior programmers experienced mainly in the areas of optics (and associated mechanics), electronics, and information processing math—as well as undersea equipment. This information is intended to enable practice of preferred embodiments of all the aspects of the invention, including the best mode of the invention, by a team of such personnel.

Figure 15:
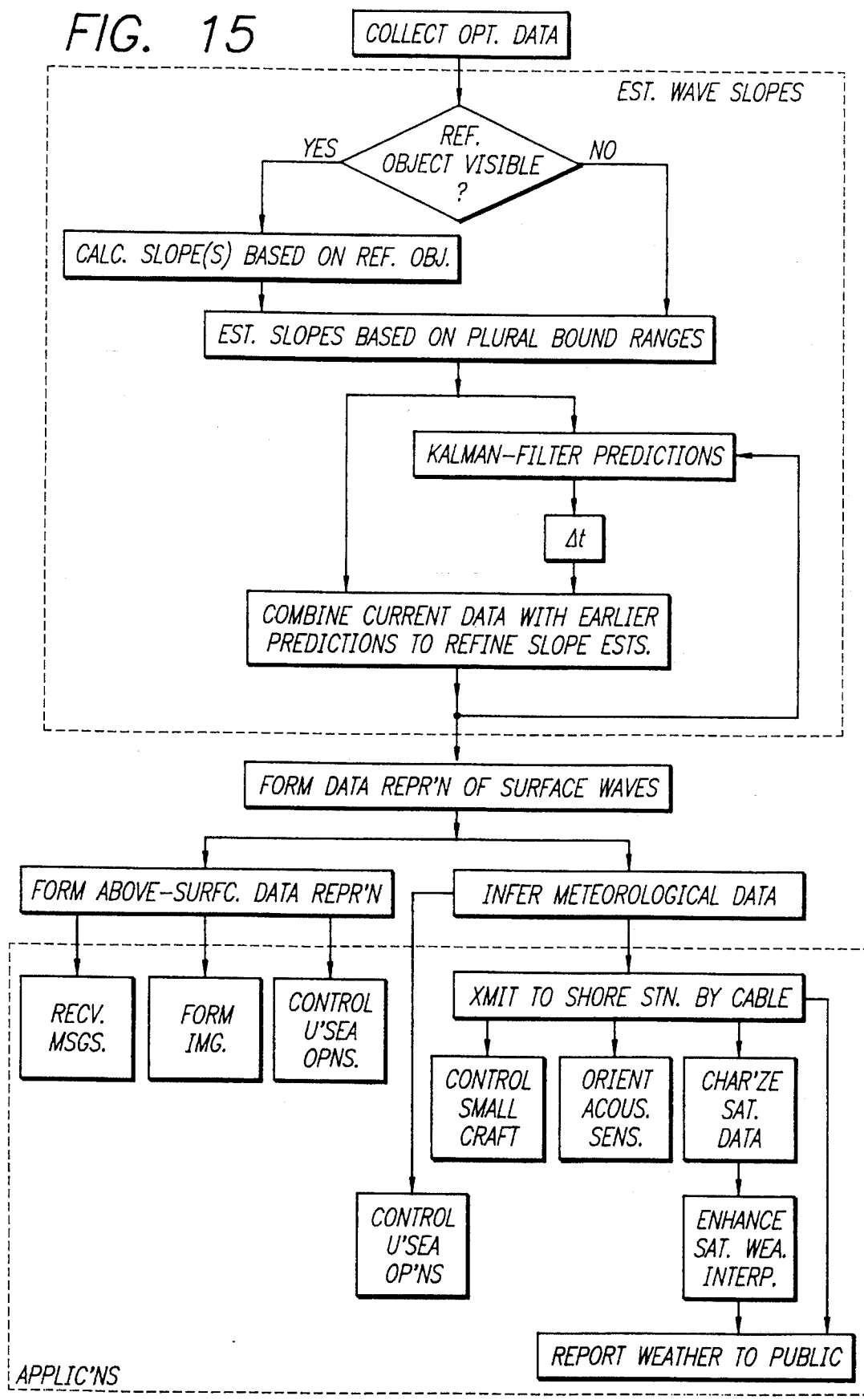
FIG. 15 is a flow chart showing software and other operations for preferred embodiments of the invention.

FIG. 15 summarizes the methodologies of my invention, and is intended to be—in the light of the descriptions and explanations presented in this text—self explanatory to those skilled in art.

From the following it will be understood that at the time of writing I have simulated, and tested the simulation of, my invention in a simplified and preliminary form, not a final or practically usable form. The information herein is good to the best of my own present knowledge of how to practice my invention.

1. USING SURFACE CHARACTERISTICS TO INFER ATMOSPHERIC CONDITIONS ABOVE THE SURFACE

Following parts of this section describe how a very detailed estimate of surface waves 11 (FIG. 1) on the ocean 12 can be developed. In a sense, that estimate is at the heart of my invention, for it is what enables acquisition of all the other data of interest. Once obtained, such an estimate of the ocean's surface can divulge a great deal of information about wind 13, precipitation 14, temperature, presence (in ocean zones remote from the equator) of icebergs 15, etc. as already set forth.

The height, frequency, degree of coherence and direction of water waves 11, for instance, will inform meteorologists of the speed and consistency of wind 13 above the surface. Small-scale surface disruptions indicate precipitation 14 reaching the water surface 11, and the character of such disruptions reveals the size and density of the precipitation 14.

From the size and density the type (rain, hail or snow), too, of precipitation 14 can be learned. Wave dynamics will also suggest whether the surface is imminently susceptible to icing, or more generally what the water surface temperature is.

Assembling all these data enables dissemination of highly localized information to small-craft operators, and thereby enables control of the movements of such craft—either by law or on advisory basis—for their safety. In the case of collection of such data by my sensor system 22 and processing system respectively mounted on and housed in a submersible or other mobile underwater equipment $21m$, weather data can also be used to help decide when it is well to move that equipment to the surface 11. Cloudiness 19 above the surface 11 can be ascertained and used for all the same purposes, through the representation techniques described in part 6 of this section.

In addition all the above-described information can be compared with simultaneously collected information from airborne or orbiting equipment 23, for example radar equipment or optical cameras, to essentially calibrate such high-altitude data gathering 24. The result—previously mentioned in terms of "characterizing" the radar data 24—will be much more meaningful radar information, and much more meaningful use of that information as for example in live weather reporting 25 to the general public 26.

2. HOUSING THE APPARATUS OF THE INVENTION

Preferred embodiments of the first and fourth aspects of the invention, as seen in FIG. 1, may include either a fixed or movable underwater installation 21. Here the emphasis is on collecting information about the environment, as for example in remote ocean areas (rather than operation of whatever equipment is holding the apparatus of the invention); such information may be transmitted 31 to shore facilities 32 by electrical or optical data cables 33.

If the dual-sensor system 22 and processing system are housed in fixed equipment, in shallow ocean zones the installation $21b$ may be placed on the ocean bottom 34; in deeper zones a bottom-tethered installation $21t$ may be used instead. Either arrangement protects the installation from waves 11 and weather 13/14, and avoids interaction with surface craft.

For a fixed installation $21b/21t$ which returns 31 weather data and the like, time requirements for return of data are not at all demanding. Preferences may be developed accordingly as between use of the sun, the moon, or an optical beacon for the reference object. Faster processing and different reference-object preferences may be suitable for the second and third aspects of the invention, whose utility may correspond more to enhancing the movements, messaging etc. of mobile equipment $21m$ that holds the apparatus 22 of the invention; even in these cases, however, data caching and relatively slow processing of the data may yield useful information over adequately short total times such as, for instance, minutes.

The sensor system may collect 35 information through generally 60° to 65° about vertical (that is, generally over a total 120° to 130° cone), but for environmental reporting a narrower collection angle may suffice since the intermediate object is simply to learn the condition of the water surface 11. This condition may be represented quite adequately by a smaller sampling of the surface.

Figure 11:
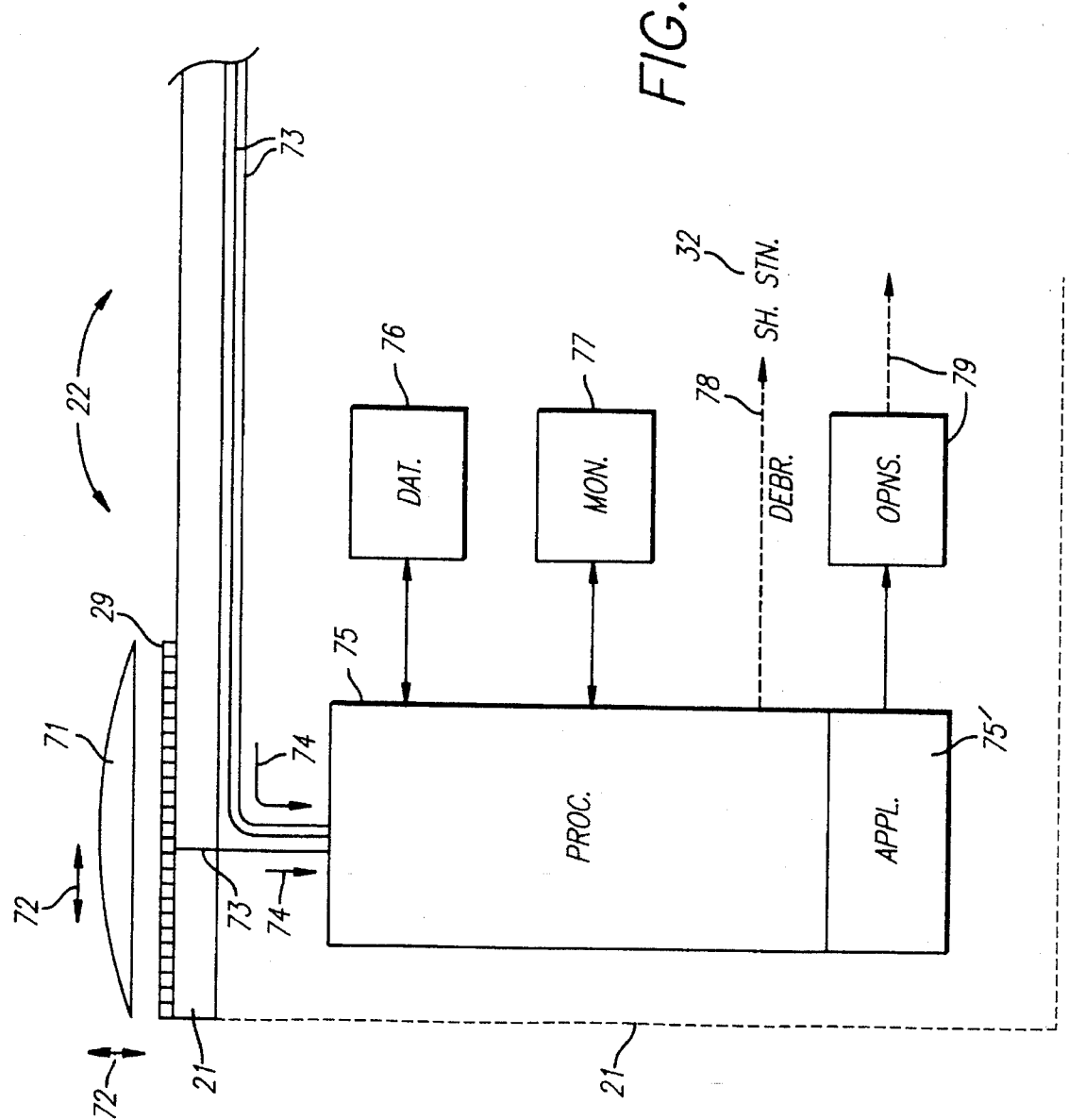
FIG. 11 is a block diagram of the apparatus of my invention.
Figure 12:
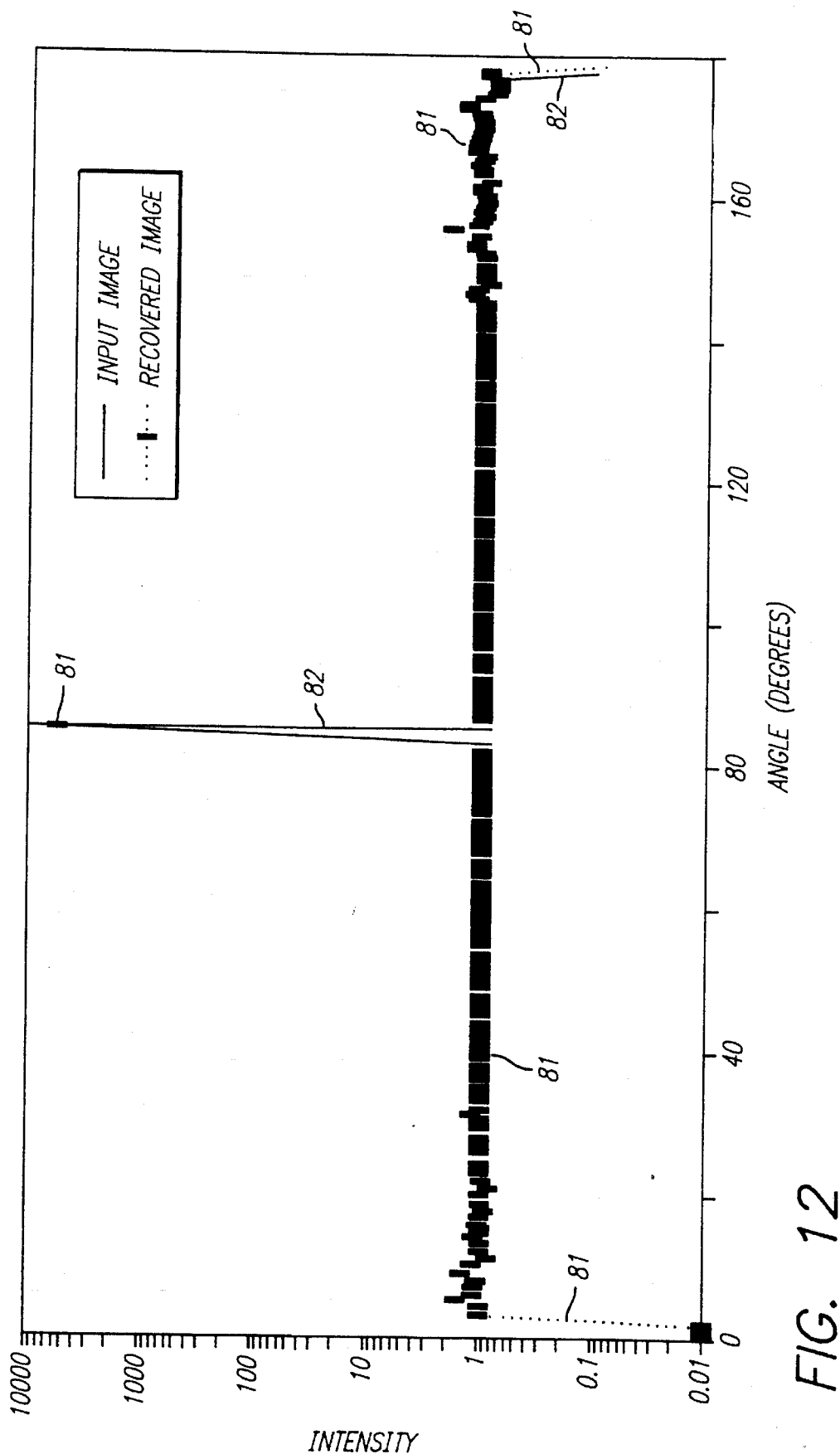
FIG. 12 is a graph of the recovered image and true (assumed) input image together, in the same simulation.
Figure 13:
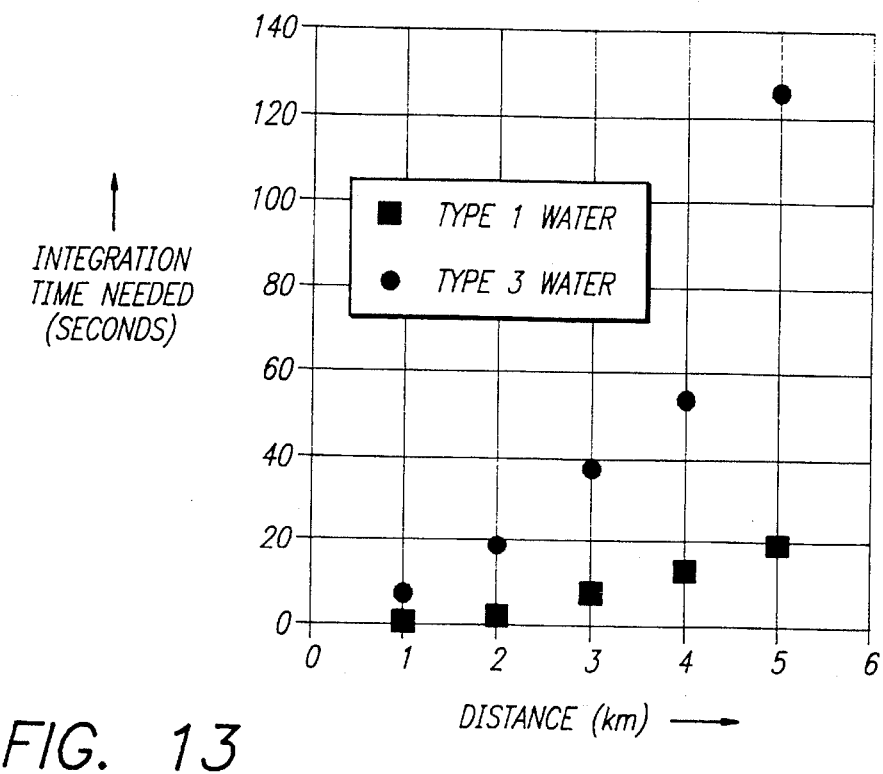
FIG. 13 is a graph of integration time required to register surface objects, for two different water types, in accordance with the same simulation.

Cables 73 (FIG. 11) transmit 74 the collected information to a data processor 75 which first develops a dynamic estimate of water-surface slopes and then, by analyzing that estimate, derives somewhat more abstract properties of the surface waves, and completes a data representation of the surface or what is above. The representation itself may be simply a data array within a processing system 75, or within an associated data-storage or data-recording system 76, that is part of the apparatus of the fourth aspect of my invention.

Thus the data array may be in volatile memory in the processing or storage system 75, 76. Alternatively the array may be held in nonvolatile memory 76 which may take the form of, for example, digital data tape, computer disc, videotape, photography, and memory cache.

As previously mentioned the practice of the invention may include using the wind-direction and -speed information to help make decisions about small-craft 17 (FIG. 1) or other equipment movements, and implementing such movements according to the decisions thus-made. As indicated in FIG. 1 this part of the practice of my invention may be implemented through a shore facility 32, with human participation at such facility as desired—or alternatively the data acquired may be simply broadcast 16 (if necessary) for direct evaluation and use by operators of the equipment 17 to be moved.

With respect to wind direction, one type of equipment whose movements may be optimized through use of my invention is an acoustic receiver array 28—typically floating light-weight equipment extended along the ocean surface 11. Such listening devices 28, used for a variety of purposes, are adversely sensitive to pickup of noise from the wind 13.

Such wind-noise interference, however, can be minimized through optimum orientation of the array 28 with respect to the wind direction. Suitable automation of the orientation is aided by an independent determination—such as the apparatus 21t, 22, 29 of my invention provides—of the direction of the wind 13.

3. ESTIMATING THE OCEAN SURFACE

To obtain these data about the world above a water surface such as the ocean surface, based upon observations made from below the surface, a suitable sensor 22 and associated operating apparatus are submerged together. For example, advantageously the sensor 22 may be, as shown, an assemblage of two or more spaced-apart arrays 29 of charge-coupled detectors (CCDs)o Each array 29 should be an unscanned two-dimensional array.

Each one of the two or more arrays 29 is in effect a complete CCD camera, and is advantageously focused on the ocean surface 11 by suitable lens means 71 (FIG. 11), so that each sensor element (e.g., each single CCD) within each array 29 receives light from a respective small area of the water surface 11. For purposes of this discussion the terms "array", "sensor array" and "camera" are interchangeable. The two (or more) arrays 29 are both focused on essentially a common overall surface region, though some peripheral nonoverlap may generally occur. The reason for using plural arrays will become more clear momentarily.

In accordance with my invention I first use this equipment to estimate certain characteristics of the ocean's surface 11. In particular I estimate the magnitude and orientation of the ocean slopes—using a combination of three techniques.

(a) Correlation with a reference object—The first of these is to use the sun 36, or at night the moon if it is above the horizon. The idea is that, given the location of the underwater equipment and given the time, the locations of the sun 36 and moon are known.

In principle other objects of known position may be used if they are in view and sufficiently bright. (For example a $$\text{ocean slope} = \frac{\cos \alpha - 3/4 \cos \theta_{sun}}{3/4 \sin \theta_{sun} - \sin \alpha} \quad (1)$$

$$\omega^2 = 2\pi g/\lambda \quad (2)$$

satellite-borne laser beacon might possibly be made bright enough for this purpose, particularly if modulated with a distinctive signature to aid detection.)

Purely for simplicity's sake, and without in the least intending to diminish the generality of possible reference objects, I shall refer to the sun 36 as the reference object. If an image of the sun appears in any individual sensor element 22', then an automatic processor can quickly determine the slope 37 of the piece of ocean 38 which is transmitting 36" the sun's rays 36' to that sensor element 22'

The ocean slope 37 is found using Snell's Law, which I employed to derive Eq. (1). In this equation, as FIG. 2 shows, $\alpha$ represents the angle of elevation at which the sun is perceived at the sensor element, and $\theta_{sun}$ is the known, true angle of elevation of the sun in the sky.

The sensor elements 22' preferably are fixed in relation to the sensor array 29; therefore, as long as the angular orientation of the array 29 itself is held still the perception angle $\alpha$ is a constant for each sensor element 22' respectively. In any event differs simply by a constant angular offset from the overall elevation angle of the array 29 (in FIG. 2 that angle is shown as zero, i.e. the array is horizontal).

If the image of the sun 36 appears in more than one individual sensor element 22' (which may be in more than one of the arrays), or in other words at more than one small area 38 of the water surface 11, then the slope 37 at each of those corresponding small surface areas 38 can be found in just the same way. Ordinarily, as the two or more arrays 29 are spaced well apart, parallax prevents the sun 36 from appearing at common small areas 38 of the surface, as seen from the two arrays respectively; therefore each array 29 of sensors 22' will yield slope 37 estimates for different groups of surface areas 38.

This technique is limited, because it will not work when the sun is not out (for example, on a cloudy day). This technique nevertheless has its benefits: when it can be used, it yields an excellent estimate of the ocean slope 37 and it requires information from only a single sensor element 22' (CCD, for example).

Figure 3:
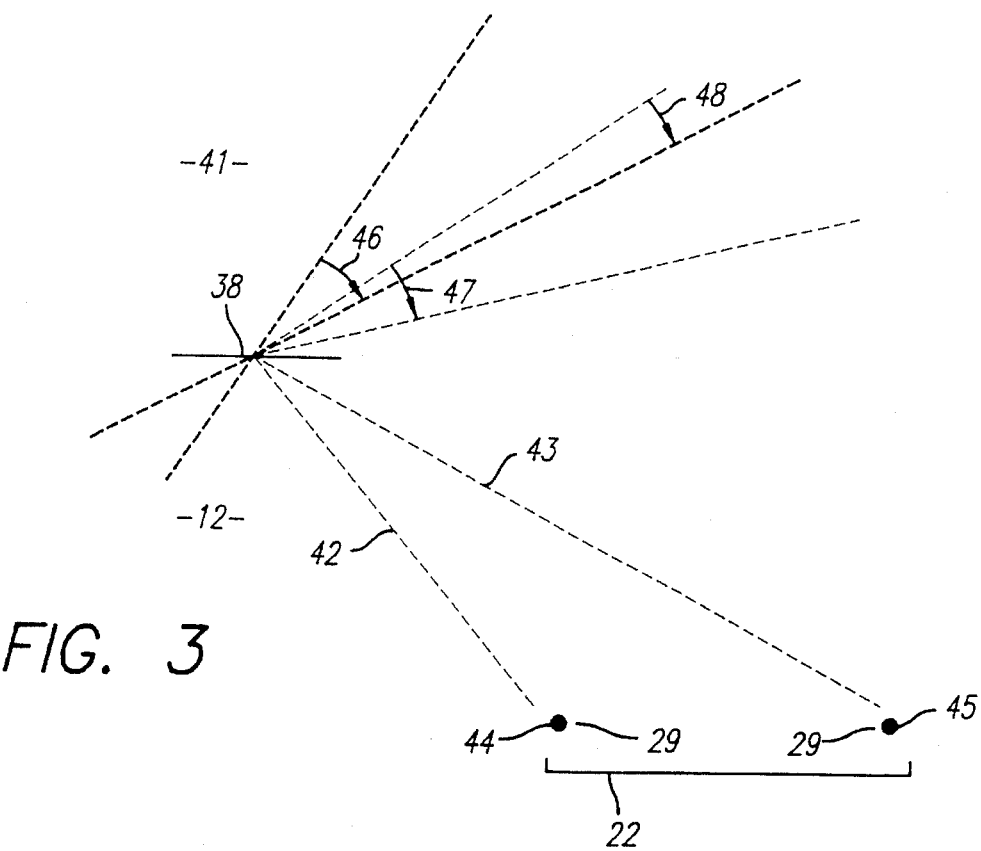
FIG. 3 is a diagram showing how preferred embodiments of the invention estimate bounds for the slopes.
Figure 4:
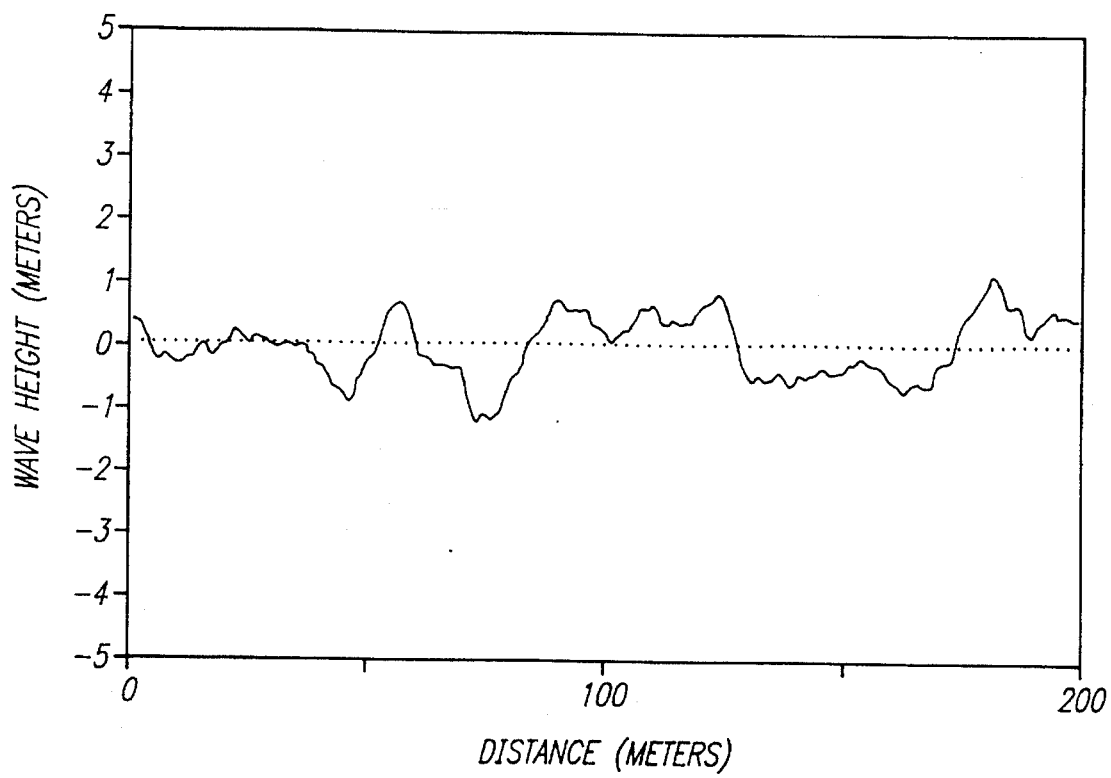
FIG. 4 is a graph of actual data representing one frame of a one-dimensional ocean simulation, for use in a one-dimensional computer simulation and evaluation of preferred embodiments of the invention.

(b) Trapping slope values between two or more sets of bounds—A second technique allows estimation of ocean slopes everywhere, but not with the precision enabled by use of a reference object. For understanding this part of my invention, FIG. 3 shows an assemblage 22 of at least two sensor arrays/cameras 29, including a left-hand array 44 and a right-hand array 45.

Here the idea is that ocean slopes can be bounded at every point by using two physical principles:

- ocean waves cannot have slopes greater than about 0.5 without breaking.
- knowledge that light has been received in a sensor element, after passing through a certain point in the ocean, bounds the slopes at that point: if the slope was not within the bounds, the light would have gone elsewhere than to the sensor element.

As to the second of these points, generally the sky 41 (FIG. 3) is much brighter than the ocean surface and everything else nearby. This fact can be exploited to place remarkably narrow bounds upon the wave surface slopes. For instance if a particular small surface area 38 appears dark, then that area must be inclined in such a way as to refract along a trajectory from some part of the water, or something in or close to the water, toward the left- hand or right-hand sensor array 44 or 45.

At first thought this condition may not seem greatly restrictive, since generally half of all possible light-arrival directions are from the water 12. The range, however, of surface orientation angles which satisfy this condition and also satisfy the 0.5-slope limitation is relatively narrow.

Incorporation of the slope limit therefore forces the fraction of light-arrival directions to be far less than half, since light must arrive from outside the wave surface, not from within the ocean mass. Detailed analysis reveals that the combined constraint based on the two principles is particularly narrow for viewing paths 42, 43 far from the vertical.

Conversely if a particular area 38 appears bright, then that area must be angled so as to refract some part of the sky 41 toward the sensor array 44 or 45. Once again this seemingly loose requirement, when combined with the limitation to slope not exceeding 0.5, yields a surface angular-orientation range 46 or 47 (for left- or right-hand camera 44 or 45 respectively) that is usefully narrow, particularly for paths 42, 43 well away from vertical.

Once sensors in each array/camera 44, 45 have estimated respective bounds 46, 47 for the ocean slopes at each point 38, the bounds learned from the two arrays 44, 45 are combined to yield an estimated slope at each point on the ocean's surface. FIG. 3 shows how this is done.

For light to be transmitted from the sky to the right-hand camera 44, only a limited range 47 (indicated by short-dashed lines) of ocean slopes is possible. The same is true for the left camera 45, but with a differently bounded range 46 (indicated by long-dashed lines).

Because of substantial spacing between the two sensors, the two ranges 46, 47 are quite different—but they should overlap at least slightly, since they correspond to the same single physical slope 37 of the water surface 11. That real slope 37 must satisfy both sets of constraints, or in other words must be within the much narrower range 48 established by combining these bounds, as FIG. 3 makes clear.

(c) Applying the known dynamics of surface waves—A third technique is to apply temporal integration or, stated more simply, to keep track of the behavior of specific surface areas and even specific waves over a period of time. This added step enables improvement of the slope estimates found from the first two techniques.

Ocean waves obey a dispersion relationship: if waves are represented in terms of their height, rather than slope, then the wavelength $\lambda$ and temporal frequency $\omega$ of a wave are related by the relationship of Eq. (2), where g is the acceleration due to gravity. It is possible to take advantage of this relationship to project the wave estimates forward in time—and perform Kalman filtering with new estimates, to improve the previous estimate of the ocean's surface.

Kalman filtering is a conventional linear prediction technique. In this technique the input is a substantially random signal, typically generated by white noise or the like, and the technique produces a predicted output in which the mean-square error relative to actual output is minimized. General information on Kalman filtering appears in Gelb, ed., *Applied Optimal Estimation* (MIT Press 1974); more specifics of its use for my invention appear in part 9 of this section.

The combination of all three estimation techniques yields very good wave estimates, as shown by the one-dimensional simulation results presented in the next part of this section.

4. SIMULATION OF SURFACE-WAVE ESTIMATING, ACCORDING TO THE INVENTION

To test these and other concepts, a one-dimensional software simulation of the invention has been prepared and operated. The portions of this simulation that relate to wave-estimating and the first aspect of the invention have three main pieces:

(a) Ocean simulator—The first piece is an ocean simulator. This consists of random Gaussian amplitudes with a Phillip's spectrum (see Phillips, *The Dynamics of the Upper Ocean*, Cambridge University Press 1977). The spectrum assumed corresponds to a ten-meter-per-second wind speed, and is a moderately rough sea. The single dimension is a cut through the sea in the wind direction.

FIG. 3 shows an example of the ocean simulation. This model ocean is sampled with twenty-centimeter resolution at 1,024 points for a total patch size of approximately two hundred meters. (Here, as the simulation is unidimensional, I use the word "patch" to refer simply to a sampled length of ocean; but in a practical two-dimensional embodiment each "patch" will be an area.)

Figure 5:
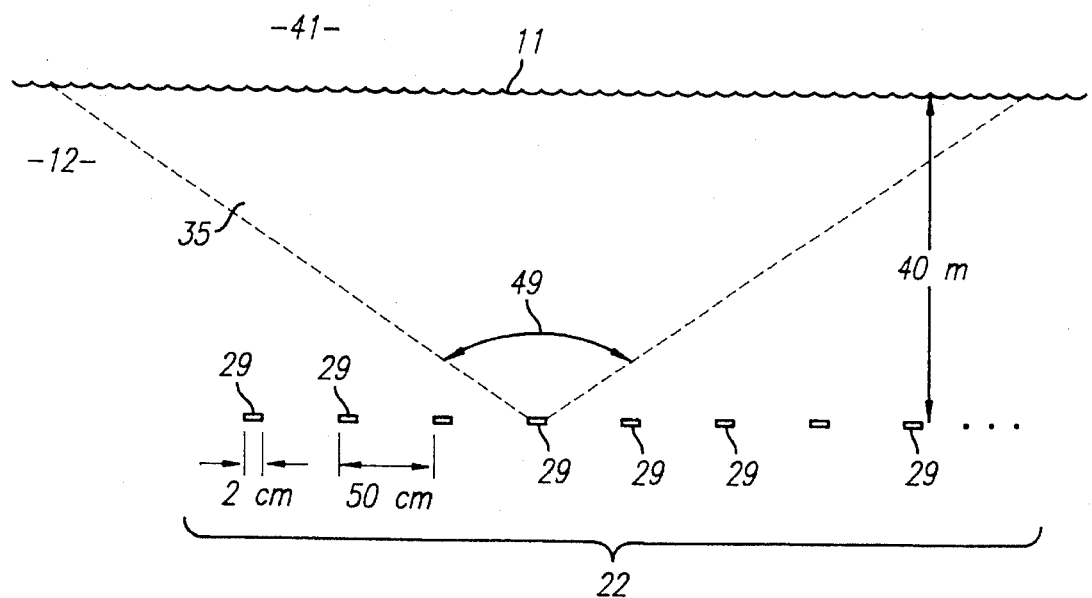
FIG. 5 is a diagram showing the general disposition and dimensions of a simulated sensor for use in the same simulation.

(b) Sensor—FIG. 5 shows a portion of the simulated sensor: an unscanned linear assemblage 22, ten meters long, of CCD arrays 29. These arrays 29, each with an overall-130° field of view 49, are spaced a half-meter apart along the assemblage, for a total of twenty-one elements—of which FIG. 5 representatively shows eight—all held forty meters below the ocean surface 11.

Figure 6:
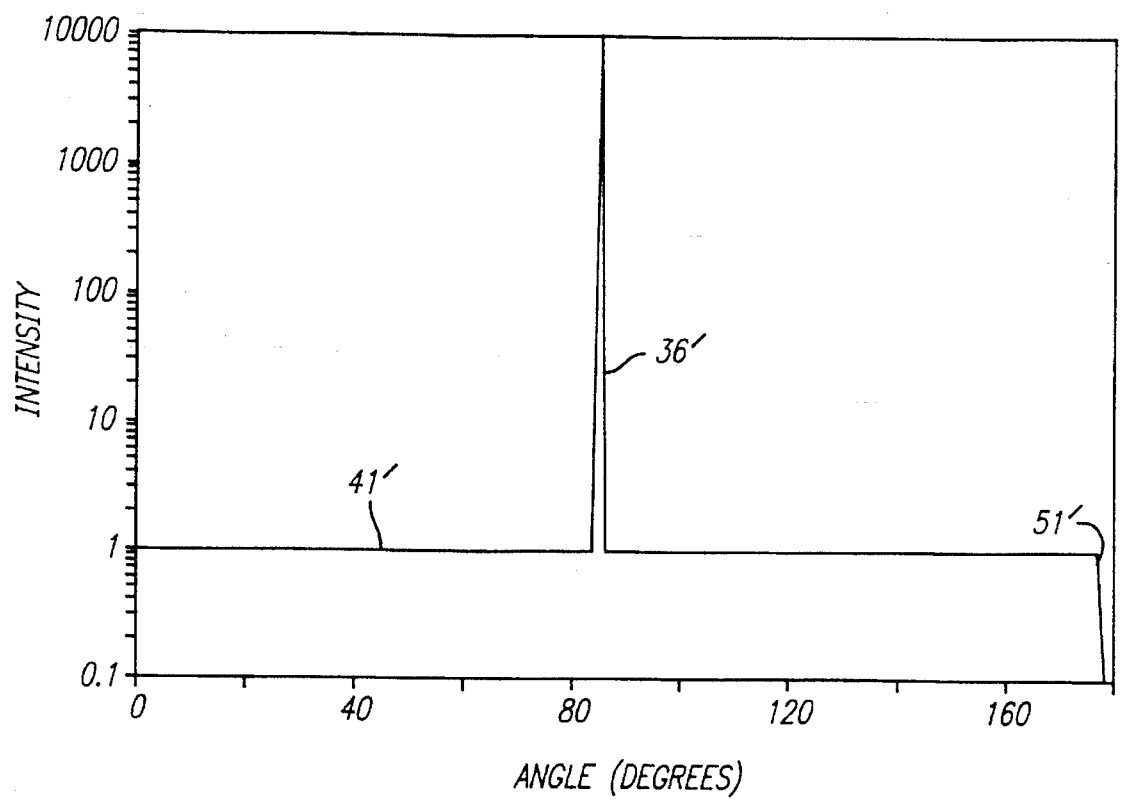
FIG. 6 is a graph of input intensity as a function of viewing angle, for use in the simulation.

(c) Input "environment"—An additional piece of the simulation is an assumed or given input illumination. For surface-wave estimating, as shown in FIG. 6 the pattern of this illumination can have just two components: a simulated sky 41', with uniform intensity of unity, and a point-source sun 36' with intensity $10^4$. (Another element of the simulation is explained in a later part of this section.)

Figure 7:
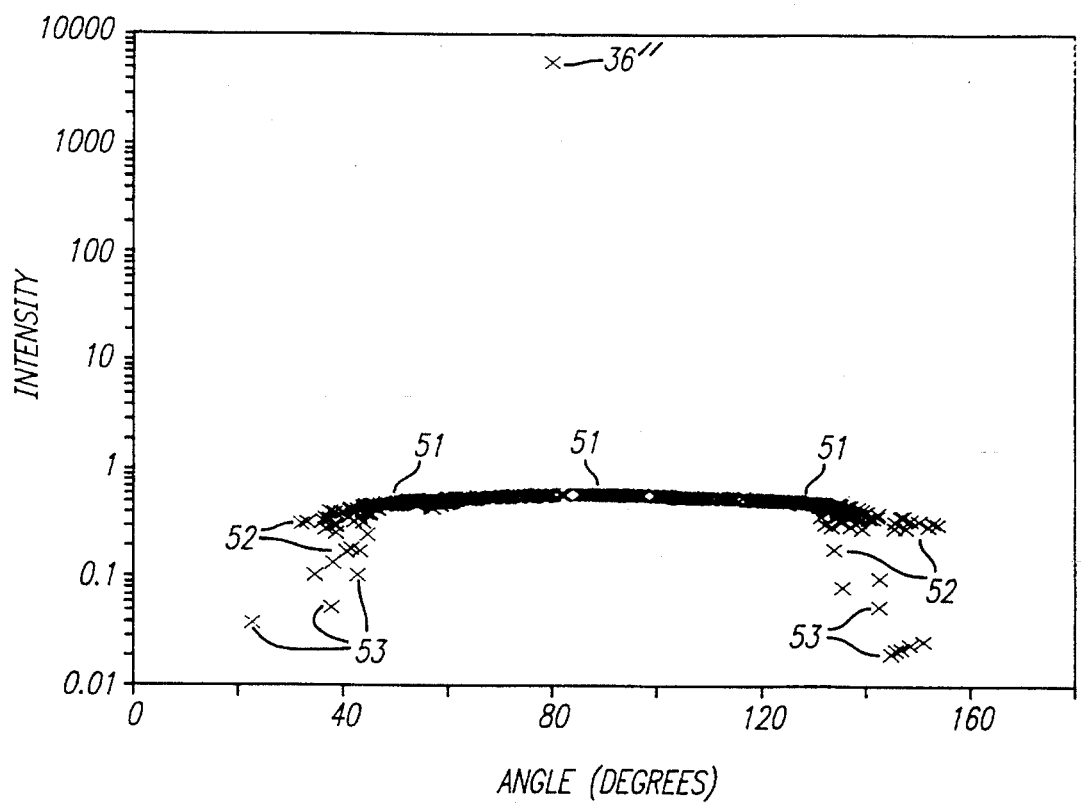
FIG. 7 is a reproduction of substantially raw data appearing on the receiver in the same simulation.

(d) FORWARD ray tracing—The next piece of the simulation ties together the earlier ones, simply following the input illumination through refraction at many surface facets to form on the simulated sensor a simulated pattern of illumination such as shown in FIG. 7. Up to this point in the simulation, all that is simulated is the production of the illumination pattern at an underwater sensor array.

This simulated illumination on the array resulted from the simulated input illumination of FIG. 6, but of course was severely scrambled by refraction at myriad divergent surface-wave angles. No effort as yet is directed to analyzing this pattern to deduce the surface slopes.

Some common-sense understanding of the representative FIG. 7 data set is possible. One individual sensor, for example, directly recovered the simulated input sun 36" at a few degrees off vertical.

The remainder of the data simply correspond to intuitive expectation of general undersea illumination: most of the data points 51 are sky light refracted from the water surface, nearly uniform across an angular range of about 45° in both directions from vertical, and grading off 52—on account of seawater attenuation—to much darker values 53 in the remaining 15° at each end of the angular range. Useful information for the purposes described in part 1 of this section, and in the earlier sections of this document, is difficult if not impossible to glean from visual study of the data as presented in FIG. 7.

The simulation produced a series of scrambled illumination patterns such as the FIG. 7 example. Twenty such patterns were generated, during a total observation time of approximately one second.

(e) BACKWARD ray tracing—for slope estimation—Next the twenty simulation frames (FIG. 7) were subjected to the ocean-surface estimation algorithm described above in part 3 of this section. It is interesting to note that in a sense this portion of the tests is not part of the simulation as such, but rather a form of practice of my invention—i.e., an actual application of software in accordance with my invention, albeit in a one-dimensional form, to a simulated data set.

Figure 8:
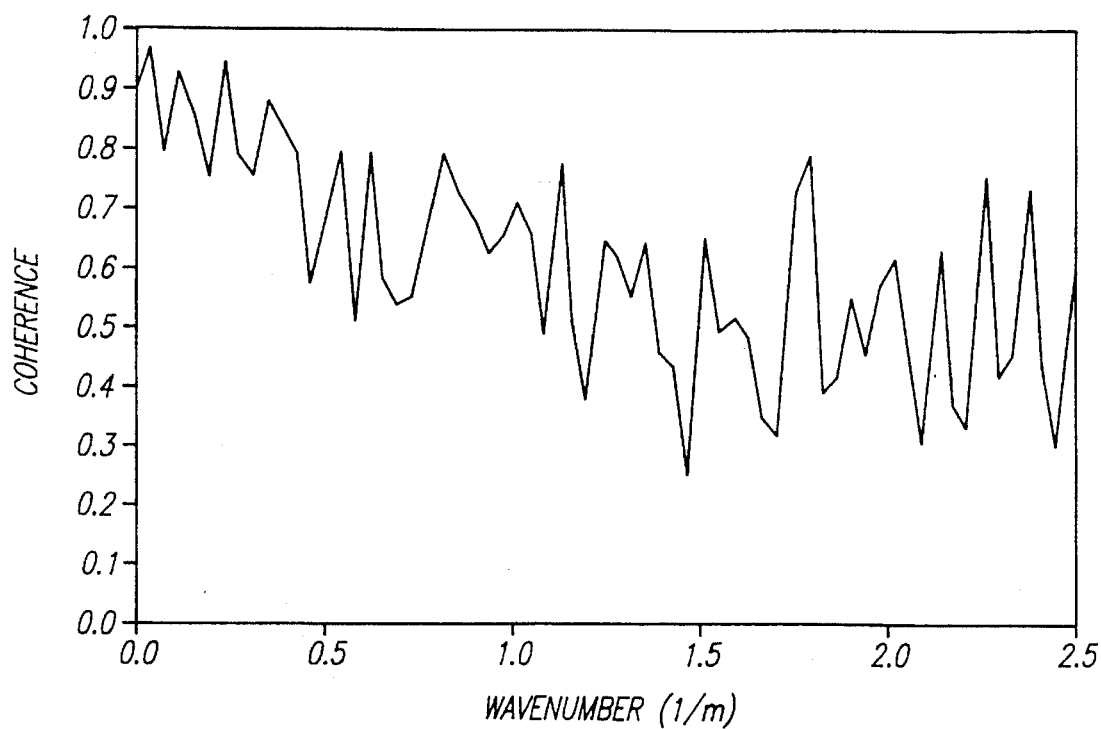
FIG. 8 is a graph of coherence between the estimated slopes in the simulation and the true (assumed) input slopes.

(f) Slope-estimating results—FIG. 8 shows the quality of the slope-estimating steps as applied to the simulated data. This graph indicates a high coherence between the estimated ocean slopes and the input (or, so to speak, "actual") ocean slopes provided by the ocean simulator described in paragraph (a) above.

By coherence is meant the relative extent of correlation between the phases of two waves, but for present purposes the term can be understood as simply a measure of the usefulness of the data produced in the slope-estimating stage.

5. SELECTIVE DATA COLLECTION

Figure 9:
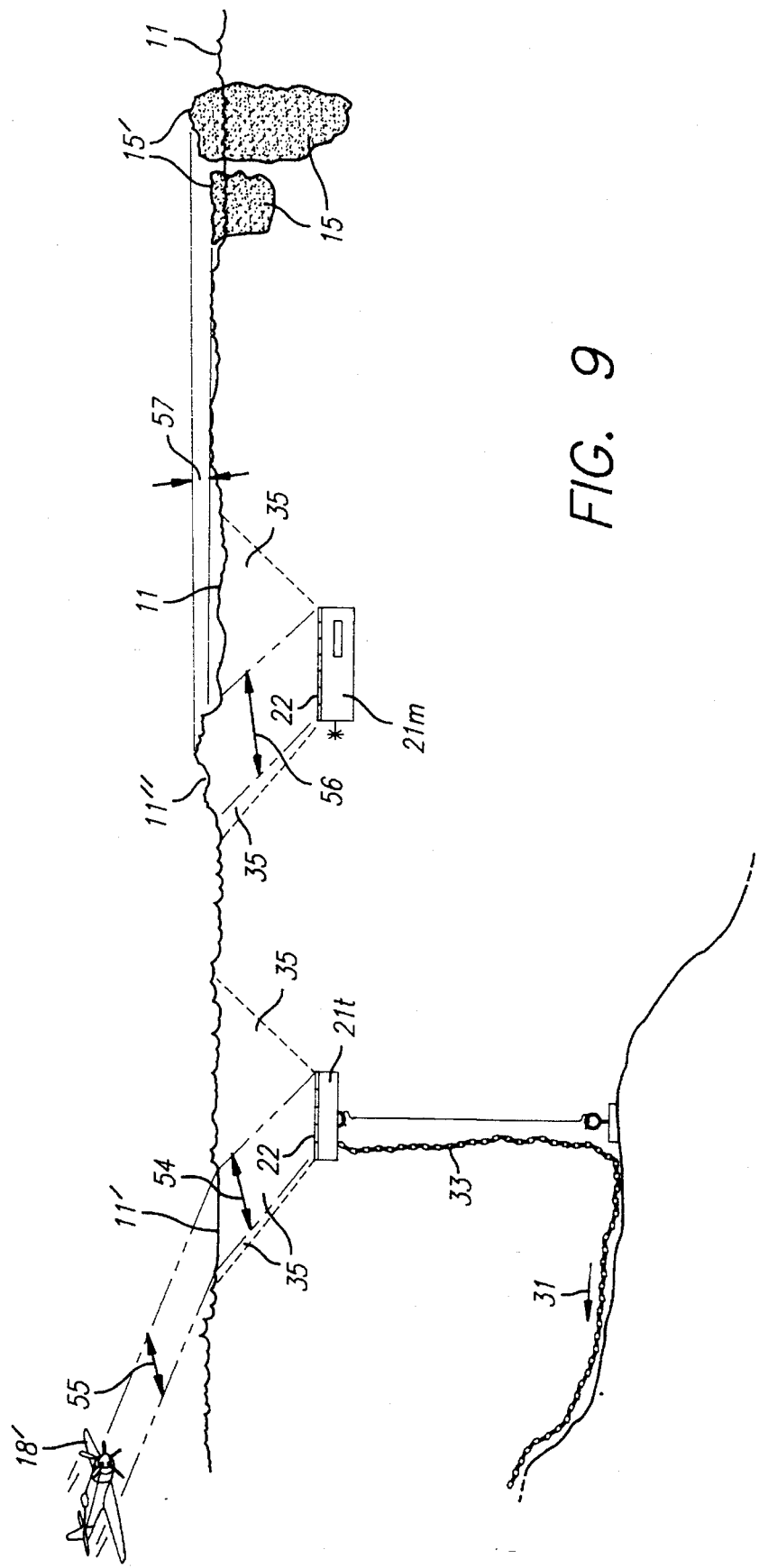
FIG. 9 is a representation like FIG. 1 but showing other preferred embodiments of the invention in use.
Figure 10:
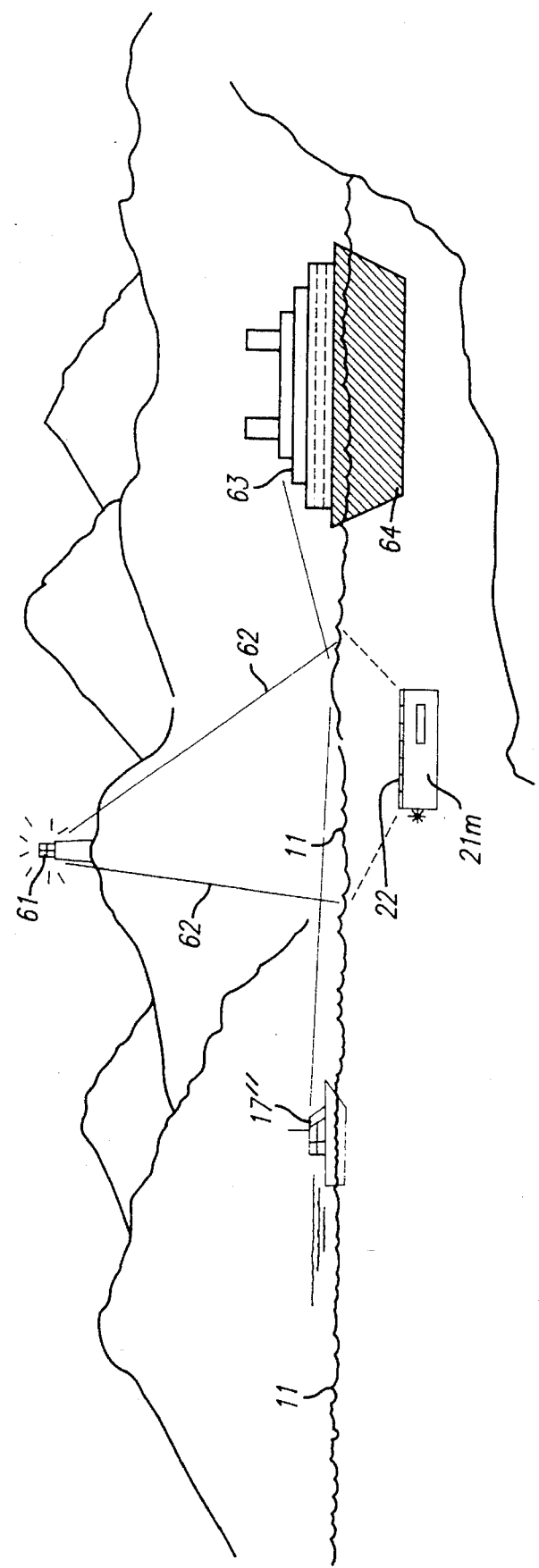
FIG. 10 is a like representation of still other preferred embodiments of the invention in use.

FIG. 9 shows special conditions whose development can be detected, and which thereby can be predicted, using the surface wave analysis discussed above. It will be understood that such use of the principles of my invention is not limited to the two examples presented.

One of these conditions is a momentarily existing relatively smooth region 11' of the water surface 11. Such a region 11' may allow useful direct but momentary viewing of what is above the water.

As mentioned earlier, through operation over the regular range 35 of input receiving angles the wave analysis of my invention can predict the random occurrence of such regions 11'. Then when they do occur, to enhance utilization of this region 11' the data-collection resources of my invention can be concentrated into a much narrower (in two dimensions) angular range 54 that corresponds generally to the extent of the anticipated region 11'.

One way of customizing data collection for this purpose is adjustment 72 (FIG. 11) of the lens means 71. In any event the resulting narrower viewing trajectory 54 within the water corresponds above the surface 11 to a different line or cone 55 of sight—which is deflected by refraction, relative to the undersea path 54.

The quality of such viewing will vary greatly with the relative degree of surface smoothness that actually occurs, and with the size, distance and character of things 17' to be seen beyond the relatively smooth region 11' in (typically) the sky. For these reasons I regard this kind of use of the principles of my invention as secondary.

More significant is another special condition somewhat the converse of the first: here the water surface locally and momentarily takes the form of a relatively tall wave 11". At the surface of such a wave (as compared with the nearby surface 11 of shorter waves, or troughs), light 57 can be received from relatively low angles of elevation above the surrounding surface 11.

Some of the light 57 received from such low angles is then redirected downward 56 toward my sensors 22, and can be collected and analyzed in accordance with other aspects of my invention. Data developed in this way can yield information about relatively remote features 15' above the surface 11.

As with the previous example, this special viewing condition occurs whether anticipated or not. Thus some relatively small fraction of the data collected even through continuing operation of my invention in its regular angular receiving range 35 will include usable information about the low objects 15' just mentioned.

The opportunity is enhanced, however, by using data obtained through operation of my invention over its regular receiving range 35, to predict the tall wave 11". Then, for the duration of the tall wave 11", data collection is concentrated in the much smaller (in two dimensions) angular range 56 where that wave 11" is expected. The result may be improved detail in the low-angle information.

6. A DATA REPRESENTATION OF WHAT IS ABOVE THE SURFACE

In addition to the use of wave-dynamics characterizations to deduce meteorological information as described above in part 1 of this section, the surface-wave estimates also enable very straightforward construction of an above-surface data-array representation. To accomplish this, rays reaching an individual sensor element are traced back, first, from the sensor to a small area of the ocean surface—and second, from that area toward the point of origin of each ray.

This second step is performed by taking into account the now-known (estimated) surface tilt 37 (FIG. 1) applicable to each ray, and applying Snell's Law to find the source direction. Finally the source direction thus found is associated with the observed light intensity at the particular sensor, to construct a representation in terms of light intensity vs. source direction.

Using this data array, several useful functions can be achieved in addition to those introduced above. Thus for example if an optical information source such as a message beacon 61 is present above the surface 11, optical information 62 can be selectively collected (FIG. 8) from that source 61 to receive message information from the source—thereby enabling undersea equipment (including for instance bottom-tethered automatic equipment 21*t*, FIGS. 1 and 9) to receive updated instructions.

The message source may be orbiting or airborne. In these cases it may be, but need not be, the same as the reference beacon mentioned earlier—or may be disposed on a nearby shore or on a nearby surface craft.

Selective collection and interpretation of optical messaging information need not include forming a human-comprehensible image, since the processing apparatus provided as part of my invention should also be able to identify automatically from the data representation the portion 61 of what is above the surface that is of interest—and thereafter to simply collect the message data 62 from that portion.

Message reception from such a source can be greatly aided by collecting a large number of fractions of the radiated optical energy that reach the sensor 22 (assemblage of arrays) via refraction through a corresponding large number of different water-surface areas. This may be true even if the message source is in the sky and even if it is the same source (or is adjacent to the same source) as a reference beacon that is in use—because the signal-to-noise ratio for message-reception purposes, particularly at high data rates, may be much more sensitive to the amount of signal power collected than is the signal-to-noise ratio for purposes of merely identifying the beacon.

Analysis of the data representation can also, in the case of mobile equipment 21*m*, aid in deciding whether to move from below the surface to the surface so as to avoid collision with a fast-moving object 17" at the surface—or whether to move or not move while below the surface to avoid a surface object 63 that extends 64 to a considerable depth underwater and is at a distance. These decisions can then be implemented.

Once again this process does not necessarily require human observation of an image display. Simple safety considerations and other data-analysis criteria for making or enabling this decision may be applied to the information in the data representation that is formed.

Such further analysis may be performed by separate applications programming 75' in the processor 75—or a separate processor section 75' within the same processor 75, or by an entirely separate processor 75'. For these purposes the desired actions may be implemented automatically or semiautomatically through interfacing 79 to the operations controls of the mobile equipment 21m. Human participation, however, may be helpful or preferable, and is within the scope of my invention.

More generally, the data representation can be used or rendered in the form of an image (for instance on a computer monitor 77) that is comprehensible to people, and that has light intensity as a function of elevation and azimuth substantially in accordance with the data representation. Within this description, the display may be created using a nonlinear function of display intensity or contrast, relative to the intensities collected—for easiest comprehension by viewers. In the case of unstaffed equipment, after transmission 78 of the necessary data to a remote, land-based station 32 (FIG. 1), such a display may be actualized there.

As FIG. 9 suggests, the earlier-introduced second aspect of the invention comes into play if the message source 61 or other features 17", 63 of interest are particularly close to the horizon. Much better information about an object may be collected by means of my invention than directly through the water. In this case, use of a relatively tall wave to provide the light-transmitting water-surface areas will facilitate obtaining good data for the feature.

Side calculations performed on the data collected for the overall scene, with prediction as before, can anticipate formation and location of such a wave. Then in appropriate time intervals the data collection can be concentrated in the anticipated area of the wave formation.

7. SIMULATION OF FORMING A DATA REPRESENTATION ACCORDING TO THE INVENTION (a) Input "environment"—For this purpose, the previously mentioned additional element of the input-illumination simulation comes more actively into play. It is a simulated object 51', with intensity 0.1, on the simulated horizon—all as shown in FIG. 6.

The object 51' is set to be fifteen meters tall, and given a simulated placement of one kilometer from the sensor 22 (assemblage of cameras) of my invention. The effects of incorporating this element 51' in the input simulation are already present in the twenty output-illumination patterns previously discussed; because it is much darker than the sky, it does not interfere with the assumptions used in the slope-bounding processes and described earlier.

The present discussion thus relates to an extension of the one-dimensional form of my invention to a further stage of analysis of a simulation data set that includes the simulated object 51'.

(b) BACKWARD ray tracing, for source determination—After use in slope estimating, as described above in part 3 of this section, the same twenty output-illumination patterns were used again, in combination with the received illumination patterns (FIG. 7), in combination with the estimated slopes 37, in trying to reconstruct a data representation of the input illumination pattern. This is accomplished through ray tracing as also described in part 3.

FIG. 9 shows such a representation 81 (superposed, for comparison, on the solid line 82 representing the input pattern), for analysis of the twenty data frames mentioned earlier. The process is doing well at this reconstruction, with a signal-to-noise ratio of approximately twenty-five decibels.

Based on these results, it is possible to estimate the amount of integration time needed to detect, within the output representation, objects (such as that 51' used in the simulation) at different distances. A quantitative estimate appears as FIG. 9: in this graph, "Type 1" water is fairly clear and "Type 3" water is murky.

FIG. 9 shows that object perception in the output data at distances up to and probably beyond five kilometers is possible for clear water, while for dirty water the effective distance is somewhat smaller. This unidimensional simulation thus indicates that my underwater reimaging invention is feasible, but a full two-dimensional simulation is planned to more fully verify the technique.

8. FIELD TEST OF THE INVENTION

A two-dimensional simulation will also help design a real sensor for use in a field test. An initial design concept for this experimental sensor will follow the sensor requirements summarized in Table 1. For a field test, these requirements appear to lead toward use of a cluster of CCDs arrays, rather than a single CCD array. One reason for this conclusion is

TABLE 1

| sensor requirements | |
|---|---|
| field of view | azimuth: 360° elevation: zenith to 65° |
| resolution at the surface | 20 cm at zenith for sensor depth of 30 m (512 × 512-pixel array) |
| sampling rate | 10 Hz |
| number of sensors | approximately 10, about 1 m apart on 3 m × 3 m rigid platform |
| single-pixel signal-to-noise ratio | comparable to commercial video cameras with 6 good bits |
| operating conditions | any time of day possibly with sun in cloudless sky ideal sensor depth 30 m | that a full reconstruction of the ocean surface requires light coming in from a very broad range of angles: the field of view should be about 60° to 65° from the vertical, providing the total 120° to 130° cone mentioned earlier. Commercially available underwater lenses will not support that field of view, and for a field test it appears less costly to have multiple arrays than to design and build a custom lens—though for a production system this choice remains open. Table 2 contains an initial design concept for components to be used in a sensor cluster.

The planned field test will be conducted near a tower 83 (FIG. 14) in relatively shallow water, about thirty-five

TABLE 2

| cluster design |
|---|
| 7-camera system: six around perimeter, one in center |
| provides full coverage, minimum overlaps |
| surface-mapped pixels (at 30 m depth) |
| center array: 0.10 × 0.13 m |
| keystoned outer array, |
| inside line 0.10 × 0.123 m |
| outside edge at 1.1 RAD angle, 0.22 × 0.26 m |
| TI CCD array 251 h × 288 vs. pixels |
| focal length all cameras: 4.8 mm |
| Pentax/Cosmicar lens available |
| auto IRIS available, desirable of solar glints |
| 7-camera enclosure in bell jar |
|     jar diameter      0.4 m |
|     height      0.2 m |
|     window diameters      0.1 m | meters deep. The CCD cluster 84 will be held on a bottom-mounted platform 85, and connected by a fiber-optic cable 86 to electronics and data processing equipment 88 on the tower.

Figure 14:
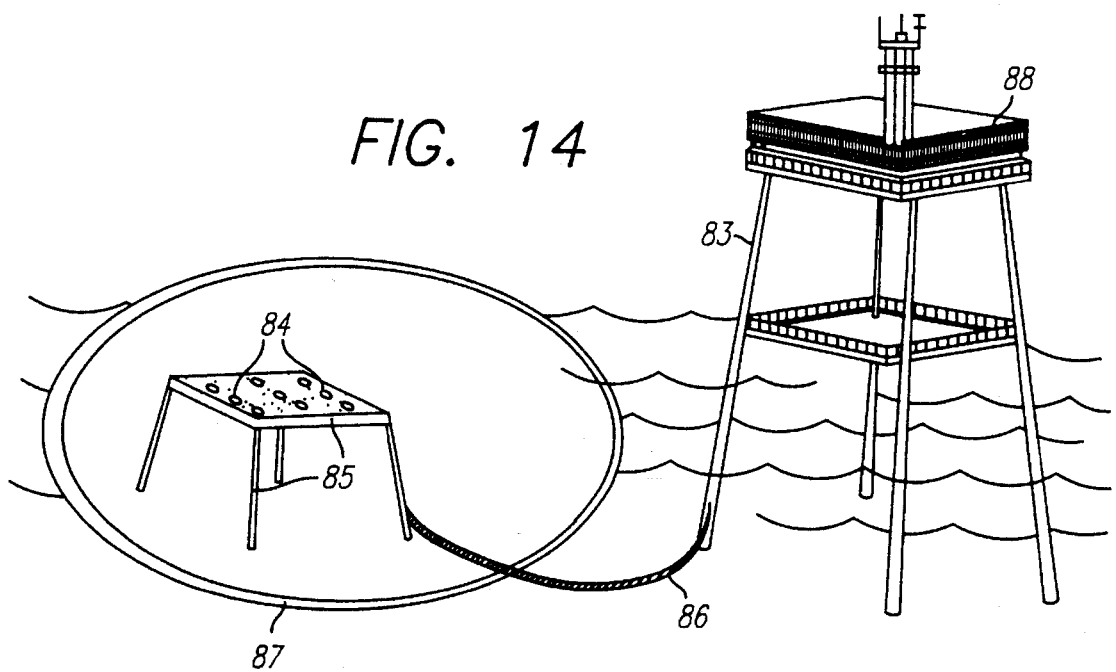
FIG. 14 is a highly schematic representation of a field setup for testing and evaluation of a preferred embodiment of the invention in two dimensions.

The viewed surface area above the platform 85 is symbolized at 87 in FIG. 14. It is planned to collect data (as video from the CCD cluster 84 at a ten-hertz data rate) and do data quality checking on site. After the physical tests, planned analysis will focus on identifying unanticipated physics or sensor problems that interfere with forming above-surface representations, and in particular reconstructing visible images. If any such problems can be overcome and indications are otherwise satisfactory, another planned task is development of an algorithm that can perform the entire process in real time or at least nearly so: this will be a key module in a production system.

9. OPERATION OF PREFERRED EMBODIMENTS

As described above, software has been prepared and operated for practice of the invention in one dimension, and that software has been put into practice by application to a one-dimensional data set which was developed by a simulation. To fully enable personnel of ordinary skill in the art to practice my invention in one dimension, either as a simulation or with data generated by real physical light-collection processes, I include in the microfiche Appendix the complete source code used in both the simulated data-set generation and the subsequent analysis.

The present code is written in the MicroSoft® version of the familiar "Fortran" programming language and runs on an IBM-compatible general-purpose desktop computer such as the types known commercially by the designations "386" and "486". With five receivers and 1,024 parent rays per input location, one-dimensional analysis according to my invention requires computing time of about thirty to forty-five minutes per data set—but roughly ninety percent of this time is consumed in generating the simulated input illumination pattern on the simulated sensors. Two-dimensional operation in near real-time, where needed, will call for more-powerful computing equipment—preferably including parallel processors—to obtain very roughly one hundred to one thousand times greater data throughput.

No hardware has been built for this work. Regarding hardware, however, the following comments are believed ample to enable persons skilled in the art to practice my invention.

Conventional CCD or other sensor arrays would be suitable for both one- and two-dimensional practice of the invention. Such arrays are commercially available, and their signal-output characteristics are well known and fully characterized in commercial product specifications and associated literature. (These facts indicate too that simulation results can be given considerable credence.) Moreover the data presented above—and particularly that in Tables 1 and 2 of this document—will be helpful in selecting such equipment and putting it into service.

As to hardware another element is an underwater lens, or lens system, capable of imaging the ocean surface onto each detector array (camera) of the overall sensor. As noted earlier, conventional and commercially available lenses can be used quite adequately with subdivided arrays—so as to avoid the need for custom lens design or fabrication at the outset. For later stages of product preparation, however, customization of larger lenses in the interest of production economies will be found well within the conventional skill in the art of underwater lenses.

Fullest enjoyment of the benefits of the second aspect (selective data collection) of my invention requires adjustable focal arrangements enabling at least some of the CCD arrays to zoom in on a relatively small area where the specially advantageous viewing conditions are anticipated. The optomechanical requirements of such a system may be somewhat more stringent than usual if the arrays, lenses and associated mechanics are implemented in the form of truly undersea equipment as such and are exposed to seawater—but nevertheless well within the state of the art. An alternative, also within the state of the art, is to operate all these elements of the system under transparent planar covers.

With respect to software for practice of my invention in two dimensions rather than one, writing of such software is within the skill of the advanced programming arts and can be accomplished without further creative contribution. Ideally this task should be guided by the code already prepared for the one-dimensional case, and also by the realization that somewhat more is involved than merely running two orthogonal one-dimensional systems at the same time.

In particular, in the one-dimensional form of my invention it is necessary to account for the two-dimensional character of wave slopes—as can be seen by reviewing, for example, FIG. 2 above. Analogously in both the slope-estimating and slope applying stages of practicing my invention in a two-dimensional form it is necessary to account for the three-dimensional properties of waves.

This means not only that the system must find (and use) the orientation as well as the magnitude of each slope, but also that the system must account for propagation of waves in directions along the ocean surface that are not aligned with the axes of the coordinate system of my invention. For this purpose I have included in my notes in the Appendix a form of the needed equation, using a so-called "complex exponential" function rather than scientific (vector) notation; the equation as expressed in this form will be more readily accessible to programmers of ordinary skill in such arts as fluid mechanics, oceanography or civil engineering—especially as the Fortran programming language includes a complex exponential function "CEXP".

In refining the Fortran code I found some awkwardnesses in the calculations, and resolved those in preparing the accompanying present software. To facilitate retaining these solutions in extension of the programming to the two-dimensional case, I shall briefly introduce some of the awkward points which were encountered.

It is possible for some rays of light to reach the sensors of my invention after first entering the ocean mass at one side of a wave, then leaving through an opposite side of that wave along an upward path, and then reentering the ocean mass via an adjacent wave, along that same upward path. My invention is not able to deal with these sorts of "carom shots" as precisely as with single entries, and a relatively large amount of computing time (and programming elaboration) is required in the effort. Hence one effective way of dealing with the relatively small amount of data that is locked up in this category of optical events is to discard them, i.e. to ignore rays that appear to have entered along upward paths (negative angle of incidence).

In addition, singularities or artifacts are found to arise in the calculations in dealing with horizontal rays—typically due to attempts to find small differences between large numbers after one or both of those numbers has been rounded. This is unfortunate since horizontal rays correspond to some simple optical cases for which output data would be desirable, as a check on operation of the system. Nevertheless in view of the noted difficulties in dealing with these cases algorithmically, horizontal rays, and also rays within rounding range (or within ½° or 1°) of horizontal, are also best discarded. An exception should be made for collection of such rays through the "tall wave" strategy (described in part 5 of this section), for which special provision should be included to eliminate reentrant as well as surface-reflected rays.

Another special optical case found to require careful handling to avoid spurious output data corresponds to a ray entering very close to a boundary between adjacent ocean-surface patches having distinctly different slopes. Actual surface slope in such a region is not well defined, but in some cases adequate processing is accomplished by proportionally splitting the ray as between the two patches. Another, simpler approach is to reject data corresponding to ray passage very close to such a boundary.

Software source code for the unidimensional form of my invention occupies the first sixty-seven frames of the microfiche Appendix. The next six frames reproduce my mathematical notes on specific application of Kalman filtering to my invention; although this formulation has already been incorporated into the software, my notes may be helpful—to those skilled in the mathematics of information processing, fluid mechanics etc.—in perceiving how to go about the equivalent programming for the two-dimensional case.

The remaining single frame contains added notes on that extension of the already-implemented unidimensional method to two dimensions, particularly including the wave-propagation equation written out with the complex exponential function rather than vector notation. As mentioned earlier this presentation will facilitate programming for full two-dimensional practice of the invention.

It will be understood that the foregoing disclosure is intended to be merely exemplary, and not to limit the scope of the invention—which is to be determined by reference to the appended claims.

What is claimed is:

1. A method for obtaining and using information about an irregular water surface, based upon optical observations made from a distance below the surface; said method comprising the steps of:

from below the water surface, observing through the water directly the respective light intensity of each of a large number of areas of the irregular water surface;

based on the observed light intensity for each of the areas, estimating surface-slope magnitudes and orientations for at least some of the areas;

assembling the light-intensity information, at least for selected areas, to form a quantitative representation of the irregular water surface; and applying the water-surface representation to control a physical process selected from the group consisting of:

using the representation to improve live radio and television weather reporting to the public, by characterizing interaction between the surface and electromagnetic radiation such as radar, then using the thus-characterized radiation interaction to refine characterization of electromagnetic-radiation observations made by satellites above the surface, then using the thus-refined satellite-observation characterization to enhance weather characterization and prediction by satellite-performed electromagnetic-radiation observations, and then reporting the thus-enhanced weather characterization and prediction to the public through live news media such as live television and radio news programs;

using the representation to improve the safety of small-craft ocean traffic, by characterizing precipitation conditions above the surface, then using the thus-characterized precipitation conditions to help make decisions about use of the surface and space above the surface by small craft, and then controlling such small-craft use according to the thus-made decisions;

using the representation to further improve the safety of small-craft ocean traffic, by estimating direction and speed of wind above the surface, then using the thus-estimated wind direction and speed to help make decisions about use of the surface and space above the surface by small craft, and then controlling such use according to the thus-made decisions;

using the representation to improve performance of wind-sensitive sound-receiving apparatus, by estimating direction and speed of wind above the surface, using the thus-estimated wind direction and speed to help make choices of acoustic-sensing-array orientation, and orienting at least one acoustic sensing array according to the thus-made choices;

using the representation to improve safety of boat traffic in areas subject to icebergs, by obtaining information about presence of icebergs, using the thus-obtained information to help make a plan for use of the surface by boats, and controlling such use by least one boat according to the thus-made plan; and further improving the safety of small-craft ocean traffic, by associating said respective light intensity with respective above-water direction, for each of the areas, through use of the estimated surface-slope magnitudes and orientations; assembling the light-intensity information as a function of direction, at least for selected areas, to determine whether it is cloudy above the surface, using the cloudiness determination to help make decisions about use of the surface or space above the surface by small craft, and controlling such small-craft use according to the thus-made decisions.

2. The method of claim 1, wherein said use of such surface or space above such surface is selected from the group consisting of:

(1) moving small craft from one place to another, (2) orienting boats substantially in one place, and (3) a combination of said (1) moving and (2) orienting.

3. A method for collecting above-water data, based upon optical observations made from a distance below the surface; said method comprising the steps of:

from below the water surface, preliminarily observing through the water directly the respective light intensity of each of a large number of areas of the irregular water surface;

based on the observed light intensity for each of the areas, preliminarily estimating surface-slope magnitudes and orientations for at least some of the areas;

based on the observed light intensities and on the slope-magnitude and slope-orientation estimates, predicting a time and a limited water-surface region at which conditions will be particularly favorable for collecting above-water data;

after the predicting step, from below the water surface applying the predictions to control selective observation, through the water directly, of the respective light intensity of each of a large number of areas of the irregular water surface in the predicted region at the predicted time.

4. The data-collection method of claim 3, further comprising the steps of:

based on the selectively observed light intensity for each of the areas at the predicted region and time, estimating corresponding surface-slope magnitudes and orientations for at least some of the areas at the predicted region and time.

5. The data-collection method of claim 4, further comprising the steps of:

associating said selectively observed respective light intensity with respective above-water elevation and azimuth, for said at least some areas at the predicted region and time, through use of the estimated corresponding surface-slope magnitudes and orientations for said at least some areas at the predicted region and time; and assembling the light-intensity information as a function of elevation and azimuth, at least for selected areas, to form a data array for at least part of an above-water space.

6. The method of claim 5, wherein:

said predicted time and region are identified with formation of a relatively tall wave;

said part of an above-water space, for which said data array is formed, is at a relatively low angle of elevation above the horizon.

7. The method of claim 6, wherein:

said portion at a relatively low angle of elevation comprises relatively remote objects in the above-water space.

8. The method of claim 5, wherein:

said predicted time and region are identified with formation of a relatively very smooth surface area;

said portion of an above-water space, for which said data array is formed, is a portion disposed beyond the smooth area along substantially a straight but refraction-deflected line.

9. A method for obtaining and using above-water-surface information, when the water surface is irregular, based upon optical observations made from a distance below the surface; said method comprising the steps of:

from below the water surface, observing through the water directly the respective light intensity of each of a large number of areas of the irregular water surface;

based on the observed light intensity for each of the areas, estimating surface-slope magnitudes and orientations for at least some of the areas;

associating said respective light intensity with respective above-water elevation and azimuth, for said at least some areas, through use of the estimated surface-slope magnitudes and orientations;

assembling the light-intensity information as a function of said elevation and azimuth, at least for selected areas, to form an above-water representation; and applying the representation to control a physical process selected from the group consisting of:

selectively collecting and interpreting optical information from a portion of what is above the surface that includes an optical information source, to receive information from the source, based upon said representation, deciding whether to move from below the surface to the surface, and then moving or not moving from below the surface to the surface in accordance with said deciding, based upon said representation, determining whether to move or not move below the surface, so as to avoid or encounter an object that is at least partly underwater and is at a distance, and then moving or not moving in accordance with said determining, and displaying a visible image that has light intensity as a function of elevation and azimuth substantially in accordance with said representation.

10. The method of claim 9, wherein:

the slope-estimating step comprises correlating at least one known above-surface illumination pattern with light intensity of some of the areas observed from below the surface.

11. The method of claim 10, wherein:

the known illumination pattern includes direct illumination from an astronomical object in a known position.

12. The method of claim 11, wherein:

the astronomical object is selected from the group consisting of the sun and the moon.

13. The method of claim 10, wherein:

the known illumination pattern includes a geometric distribution of scattered illumination from an astronomical object in a known position.

14. The method of claim 10, wherein:

the slope-estimating step comprises the substep of determining bounds for slopes of some areas, other than those areas where said known illumination pattern is seen, based upon a priori knowledge of physical phenomena.

15. The method of claim 14, wherein:

the slope-estimating step comprises coordinating said correlating and said bound-determining substeps to estimate slopes for still other areas.

16. The method of claim 14, wherein the slope-estimating step comprises:

coordinating said correlating and said bound-determining substeps to predict future slopes; and coordinating said predicted future slopes with later correlating and bound-determining substeps to refine said slope-estimating step for still-later observations.

17. The method of claim 9, wherein the intensity-associating step comprises the substeps of:

determining an observation angle for each of the areas; and applying Snell's law to the determined observation angles and estimated slopes.

18. The method of claim 17, wherein the intensity-associating step further comprises the substeps of:

determining the observation depth; and allowing for intensity attenuation due to propagation distance through water for each of the at least some areas.

19. The method of claim 9, wherein:

said large number is greater than 10,000.

20. The method of claim 9, wherein:

said large number is on the order of 250,000.

21. The method of claim 9:

wherein the physical process comprises displaying an image; and comprising the further step of, before or during the displaying step, modifying the representation to compensate for elevation distortion arising in said associating step.

22. The method of claim 9:

wherein the physical process comprises displaying an image; and further comprising, before the displaying step, the steps of recording the representation or image and then retrieving the recorded representation or image for use in the displaying step.

23. The method of claim 22, wherein:

the recording step comprises making a record by means selected from the group consisting of digital data tape, computer disc, videotape, photography, and memory cache.

24. Apparatus for obtaining and using an above-water-surface representation, when the water surface is irregular, based upon optical observations made from a distance below the surface; said irregular surface having the effect of scrambling what is above the water as viewed from said distance below the surface; said apparatus comprising:

- optical sensor means, for disposition at a distance below the surface to receive light from the surface, through the water directly, and in response generate signals corresponding to intensity of the received light as a function of reception angle;
- programmed processor means for processing said signals to analyze and correct for at least part of the scrambling effect of the surface and so form a representation of at least part of what is above the water; and
- utilization means for applying the representation to control a physical process.

25. The apparatus of claim 24, wherein:

- the sensor means comprise means for generating electronic signals; and
- the processor means comprise at least one electronic processor.

26. The apparatus of claim 24, wherein:

- the sensor means comprise means for generating digital signals; and
- the processor means comprise at least one digital processor.

27. The apparatus of claim 24, wherein the processor means comprise:

- means for forming a first signal matrix corresponding to intensity of received light as a function of reception angle;
- means for analyzing the first signal matrix to estimate surface-slope magnitudes and orientations for a large number of areas of the irregular water surface; and
- means for interpreting the first signal matrix, through use of the estimated surface-slope magnitudes and orientations, to form a second signal matrix corresponding to intensity of received light as a function of elevation and azimuth of the above-water scene, at least for selected areas.

28. The apparatus of claim 27, wherein the utilization means comprise:

- means for utilizing the second signal matrix as a representation of at least part of what is above the water to control a physical interaction with elements of what is above the water.

29. The apparatus of claim 24, wherein:

- the utilization means comprise means for using the representation to display an image intuitively usable by a human being as a visual analogue of at least a part of what is above the water; and
- said physical process is said display.

30. The apparatus of claim 29, wherein:

- the image has light intensity as a function of elevation and azimuth substantially in accordance with at least a part of said representation.

31. The apparatus of claim 30, wherein:

- the utilization means comprise means for modifying the representation, before or during the display, to correct for altitude distortion in the representation.

32. The apparatus of claim 24, in further combination with:

- movable equipment carrying said apparatus, in position to receive light from the water surface at least when at a distance below the water surface.

33. The apparatus of claim 32, wherein:

- the utilization means comprise means for applying said representation to control operations of the equipment.

34. The apparatus of claim 32, wherein:

- the utilization means comprise means for applying said representation to control operations of the equipment, said operations being selected from the group consisting of steering, and receiving messages.

* * * * *